(12) United States Patent
Goshey et al.

(10) Patent No.: US 6,934,722 B1
(45) Date of Patent: Aug. 23, 2005

(54) METHOD OF FINDING APPLICATION COMPONENTS IN AN INTELLIGENT BACKUP AND RESTORING SYSTEM

(75) Inventors: Michael M. Goshey, San Jose, CA (US); Guido Maffezzoni, San Jose, CA (US); Kristine N. Luong, Santa Clara, CA (US); Tony Fu, Placentia, CA (US)

(73) Assignee: Adaptec, Inc., Milpitas, CA (US)

( * ) Notice: Subject to any disclaimer, the term of this patent is extended or adjusted under 35 U.S.C. 154(b) by 661 days.

(21) Appl. No.: 09/256,680

(22) Filed: Feb. 23, 1999

Related U.S. Application Data

(63) Continuation-in-part of application No. 09/110,783, filed on Jul. 6, 1998, now Pat. No. 6,205,527.
(60) Provisional application No. 60/075,687, filed on Feb. 24, 1998.

(51) Int. Cl.$^7$ .............................................. G06F 17/30
(52) U.S. Cl. .................... 707/204; 707/202; 707/203; 717/109; 717/139
(58) Field of Search .............................. 707/202, 203, 707/204; 395/702, 712

(56) References Cited

U.S. PATENT DOCUMENTS

| | | | |
|---|---|---|---|
| 5,269,022 A | 12/1993 | Shinjo et al. | 375/700 |
| 5,469,573 A | 11/1995 | McGill, III et al. | 375/700 |
| 5,694,600 A | 12/1997 | Khenson et al. | 395/652 |
| 5,713,024 A | 1/1998 | Halladay | 395/712 |
| 5,754,782 A | 5/1998 | Masada | 395/200.43 |
| 5,778,395 A * | 7/1998 | Whiting et al. | 707/204 |
| 6,073,128 A * | 6/2000 | Pongracz et al. | 707/3 |
| 6,269,381 B1 * | 7/2001 | St. Pierre et al. | 707/202 |

OTHER PUBLICATIONS

Unknown, *XactCopy Backup and Restore Strategy Promotional Materials and White Paper*, DuoCor, Inc., Nevada City, CA (Jun. 1, 1998), 20 pages.

\* cited by examiner

*Primary Examiner*—Luke S. Wassum
*Assistant Examiner*—Khanh Pham
(74) *Attorney, Agent, or Firm*—Martine Penilla & Gencarella, LLP

(57) ABSTRACT

A method for finding application components installed on a computer system for use in a backup system associated with the computer system includes creating a linked list of application components installed on the computer system. The nested directories are then traced back to find a target directory for each application component in the linked list. Thereafter, a request to find a selected application is received from a calling module. The method may further include the operations of searching the linked list for a target directory for each component of the selected application, and making the target directory for each component of the selected application available to the calling module, preferably by returning the target directories to the calling module. A computer readable media for finding application components installed on a computer system for use in a backup system associated with the computer system also is described.

21 Claims, 26 Drawing Sheets

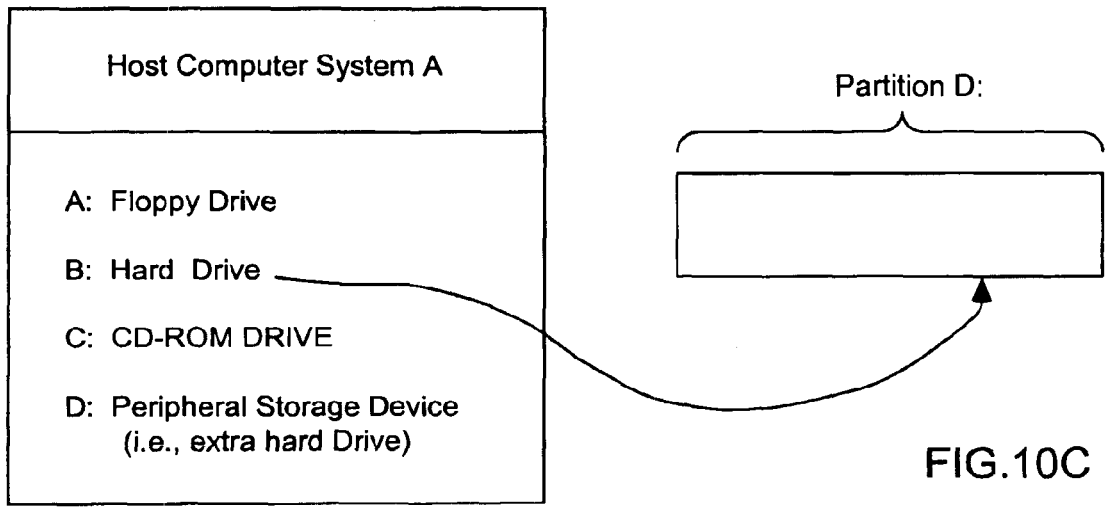
FIG.10B
FIG.10C
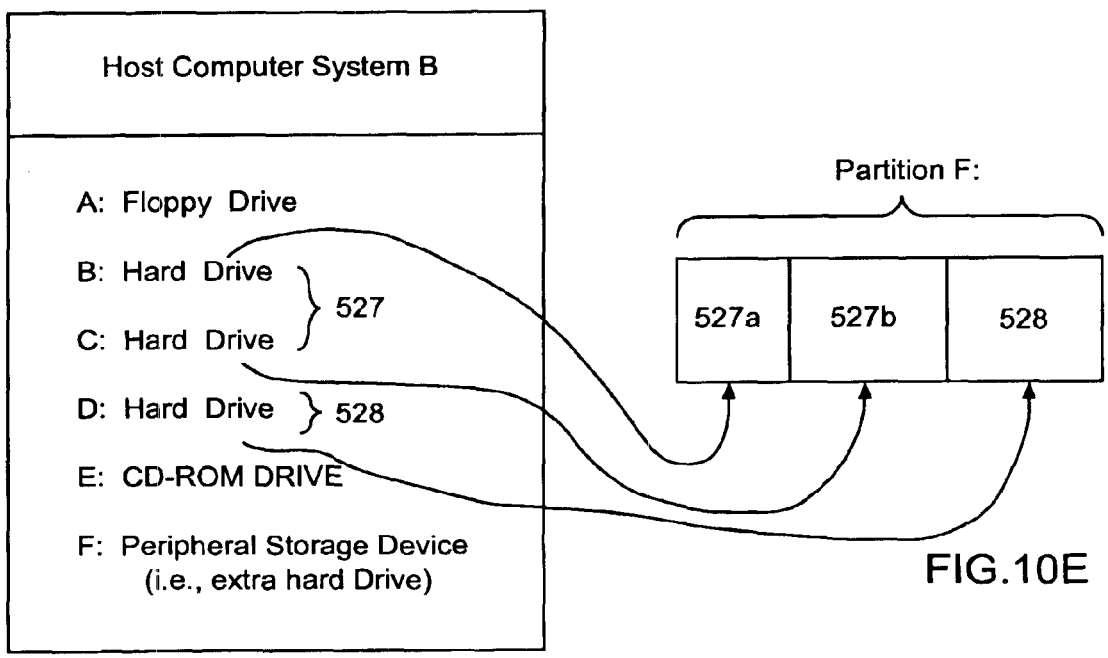
FIG.10D
FIG.10E

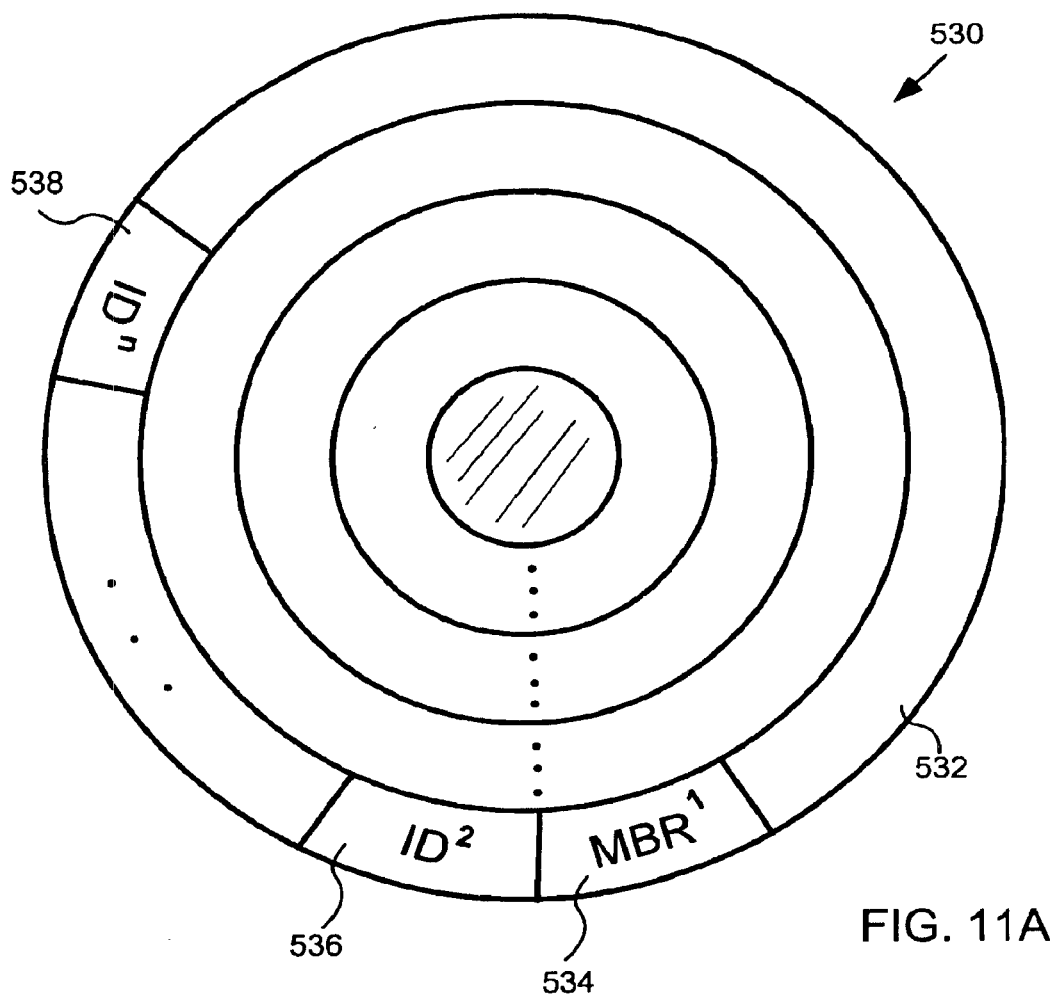
FIG. 11A
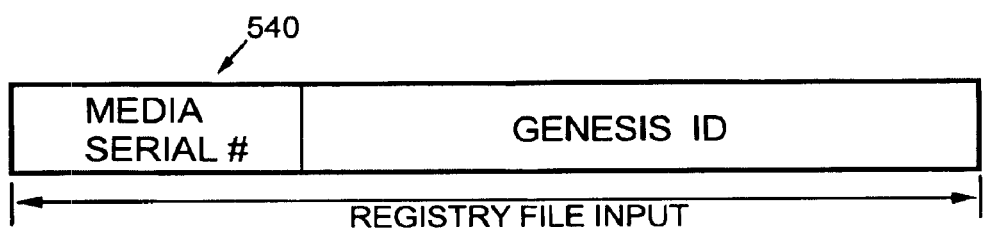
FIG. 11B
FIG. 11C

METHOD OF FINDING APPLICATION COMPONENTS IN AN INTELLIGENT BACKUP AND RESTORING SYSTEM

CROSS REFERENCE TO RELATED APPLICATIONS

This application claims priority from U.S. Provisional Patent Application No. 60/075,687, filed Feb. 24, 1998, and entitled "Method and Apparatus for Data Backup and Data Restoring after Storage Drive Failures." This application also claims priority from U.S. patent application Ser. No. 09/110,783, filed Jul. 6, 1998, and entitled "Intelligent Backup and Restoring System and Method for Implementing the Same," now U.S. Pat. No. 6,205,527. Each of these patent applications, from which priority is claimed, is incorporated herein by reference.

This application is related to the following applications: (1) U.S. patent application Ser. No. 09/256,676, filed on the same day as the instant application, and entitled "Method of Generating a Database for use in an Intelligent Backup and Restoring System," now U.S. Pat. No. 6,684,229; (2) U.S. patent application Ser. No. 09/256,682, filed on the same day as the instant application, and entitled "Automated Drive Repair Systems and Methods," now U.S. Pat. No. 6,374,366; (3) U.S. patent application Ser. No. 09/256,687, filed on the same day as the instant application, and entitled "Method for Managing Primary and Secondary Storage Devices in an Intelligent Backup and Restoring System," now U.S. Pat. No. 6,532,535; (4) U.S. patent application Ser. No. 09/256,686, filed on the same day as the instant application, and entitled "Method for Generating a Footprint Image File for an Intelligent Backup and Restoring System," now U.S. Pat. No. 6,374,363; (5) U.S. patent application Ser. No. 09/256,641, filed on the same day as the instant application, and entitled "Drive Preparation Methods for Intelligent Backup Systems," now U.S. Pat. No. 6,289,426); and (6) U.S. patent application Ser. No. 09/256,681, filed on the same day as the instant application, and entitled "Method and System for Backing up a Disk Drive upon a System Failure," now U.S. Pat. No. 6,385,707. Each of these related applications is incorporated herein by reference.

BACKGROUND OF THE INVENTION

1. Field of the Invention

This invention relates generally to intelligent backup systems and, more particularly, to methods and apparatus for intelligently backing up selected data from a host computer's main storage drive to prevent loss of data or user productivity.

2. Description of the Related Art

In recent years, personal computers have become an integral necessity in both the work and home environment. For many people, personal computers have become their main communication system, which can be used for sending and receiving electronic mail (i.e., e-mail), transferring files over a local area network (LAN), and communicating over the world wide web via the Internet. Because people have placed such a high level of dependence on their personal computers, when a failure (i.e., crash) to either a hardware or software component occurs, the user will generally suffer greatly in terms of productivity loss.

Many times, failures to either hardware or software components can lead to the complete loss of personal data, which often cannot be recovered using standard data recovery tools. In efforts to remedy the severity of such data loss, many people perform routine backups of their entire hard drives or files. In this manner, if an unrecoverable failure were to occur, then the user would lose only the data that was created between the last backup operation and the unrecoverable failure.

Unfortunately, relying on periodic backups of a computer's storage drives (i.e., hard drives) does not eliminate the loss in productivity suffered while the failure is being attended to, and the need to reconstruct all of the lost data that was created between the last backup and the failure. To further complicate the reconstruction process, most of today's computer software products have to be installed using complex installation software that is designed to place each component of the software product in the correct system folder location, registry file, startup file, etc., to preserve proper functionality with the computer's operating system. As a result, even though the entire contents of a backup can be retrieved from the backup media, the restoring of a subsequently repaired storage drive will require a substantial amount of reconstruction.

Although the restoration of failed storage devices can sometimes be a trivial process when only a minor number of programs are re-installed onto the failed computer system, most of today's computer systems use a wide number of programs, each requiring custom installation for proper operation. Furthermore, because most computer users purchase, update, and modify computer programs over the Internet, it is often impossible to reconstruct the original state of all programs, patches, or executables that are loaded onto a computer without keeping detailed logs of where each component was acquired. As a result, when attempts to reconstruct a user's computer system are made, many of the originally installed software programs or components may not be installed because they are no longer available or supported by the original supplier.

Notwithstanding that most failures that are a result of a hardware malfunction or a software problem can be fixed, either by complete replacement or by performing repairs, users still experience data losses that produce harsh penalties in productivity or require significant down time. That is, even if users systematically backup their system regularly, some amount of data will be lost between the time of the last backup and the subsequent restoration. In certain circumstances, even if only a small amount of data is lost, that small amount may translate into many hours of reconstruction time. Furthermore, if the lost data was a time sensitive piece of data, then reconstruction over many hours or days may not be acceptable.

In view of the foregoing, there is a need for an intelligent backup system and method for implementing the system to protect data of a computer's storage drive in case a system failure occurs. There is also a need for a system and a method for implementing the system that will enable a user to continue working from the intelligently backed-up data after a system failure occurs, and then restore the failed system after the system failure is intelligently identified and repaired.

SUMMARY OF THE INVENTION

Broadly speaking, the present invention fills these needs by providing an intelligent backup and restore system that prevents downtime productivity losses, and assists the user in trouble shooting the failure, repairing the failure if possible, and restoring the failed system back to its pre-failure condition. All of these functionalities are provided to the user through a user friendly graphical user interface that helps the user resume his or her normal computer use by booting to a peripheral storage device (that holds an intelligently backup data set) while the failure is remedied. It should be appreciated that the present invention can be implemented in numerous ways, including as a process, an apparatus, a system, a device, a method, or a computer readable medium. Several inventive embodiments of the present invention are described below.

In one aspect of the invention, a method of finding application components installed on a computer system for use in a backup system associated with the computer system is provided. In this method, a linked list of application components installed on the computer system is first created. The nested directories are then traced back to find a target directory for each application component in the linked list. Thereafter, a request to find a selected application is received from a calling module. In one embodiment, the method further includes the operation of searching the linked list for a target directory for each component of the selected application. In this embodiment, the target directory for each component of the selected application is made available to the calling module, preferably by returning the target directories to the calling module.

In one embodiment, the operation of creating the linked list of application components installed on the computer system includes scanning shortcut link files to find a target directory for each component of applications having a shortcut link file. The calling module preferably includes a graphical user interface that displays the applications installed on the computer system. The selected application may be either an individual application or an application suite.

In another aspect of the invention, a computer readable media is provided. In one embodiment, the computer readable media contains program instructions implementing the above-described method for finding application components installed on a computer system for use in a backup system associated with the computer system. Thus, in this embodiment the computer readable media contains program instructions for (1) creating a linked list of application components installed on the computer system, (2) tracing back nested directories to find a target directory for each application component in the linked list, and (3) receiving a request to find a selected application from a calling module. In another embodiment, the computer readable media also contains program instructions for searching the linked list for a target directory for each component of the selected application, and program instructions for making the target directory for each component of the selected application available to the calling module.

The program instructions for making the target directory for each component of the selected application available to the calling module preferably include program instructions for returning the target directory for each component of the selected application to the calling module. In one embodiment, the program instructions for creating the linked list of application components installed on the computer system include program instructions for scanning shortcut link files to find a target directory for each component of applications having a shortcut link file.

The backup and restore system of the present invention is advantageously designed to intelligently protect a user's data and productivity upon experiencing a hard disk failure. In one embodiment, once the backup and restore system is installed and set-up, the backup operations are performed in an incremental fashion (e.g., after the initial full backup, only those files that have changed from one backup to another will be backed up) to a peripheral storage device media. It should be appreciated that this incremental backup technique provides a powerful level of performance enhancement over conventional backup systems.

Another advantage of the intelligent backup and restore system of the present invention is that it substantially eliminates the tremendous downtime that is typical of when a hard disk crash is experienced and no backup or simple conventional backup techniques are used. As a result, user productivity will no longer suffer when hard disk failures occur. In addition, the embodiments of the present invention also assist the user in attempting to repair the crashed hard disk. However, if the crashed hard disk is not repairable, the system will automatically detect when a new hard disk is added to the user's system, and then assists in partitioning and formatting the hard disk for the user. When a new hard disk is prepared or the old hard disk is repaired, the system will restore the operating system and data files to their current state as now present on the peripheral storage device media. Upon re-booting, the newly restored hard disk will once again become the boot device. Another advantage of the present invention is that the peripheral storage device media does not have to be identical to that of the system's hard drive. More specifically, even though most computer systems implement IDE/EIDE hard drives, the peripheral storage device (that is internal or external) does not have to be an IDE/EIDE drive. Although they can be the same, they may be of any type, standard, or size other than that of the computer system. Further yet, because the peripheral storage device media may be of a different kind and size than that of the computer system, when the spare tire backup is created, a file-based copying operation is advantageously implemented.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 10B through 10E illustrate the intelligent partitioning performed on the peripheral storage device media when one or more logical local hard drives are present on the host computer system in accordance with one embodiment of the present invention.

FIG. 11A shows a top view of a first selected track and selected sectors of a peripheral storage device media in accordance with one embodiment of the present invention.

FIGS. 11B–11C show the format of a Genesis ID that is written to one or more sectors of the peripheral storage device media and the data that is written to the system's registry file in accordance with one embodiment of the present invention.

DETAILED DESCRIPTION OF THE PREFERRED EMBODIMENTS

An invention is described for an intelligent backup and restore system that prevents downtime productivity losses, and assists the user in troubleshooting the failure, repairing the failure if possible, and restoring the failed system back to its pre-failure condition. It will be obvious to one skilled in the art, however, that the present invention may be practiced without some or all of the specific details set forth below. In other instances, well known process operations have not been described in detail to avoid unnecessarily obscuring the present invention.

In the following description, the intelligent backup and restore system will be referred to by its development name "Genesis," however, emphasis will be placed on describing the technical functionality and software interactions between its various components, a host computer system's operating system, and peripheral storage devices and associated media.

Figure 1A:
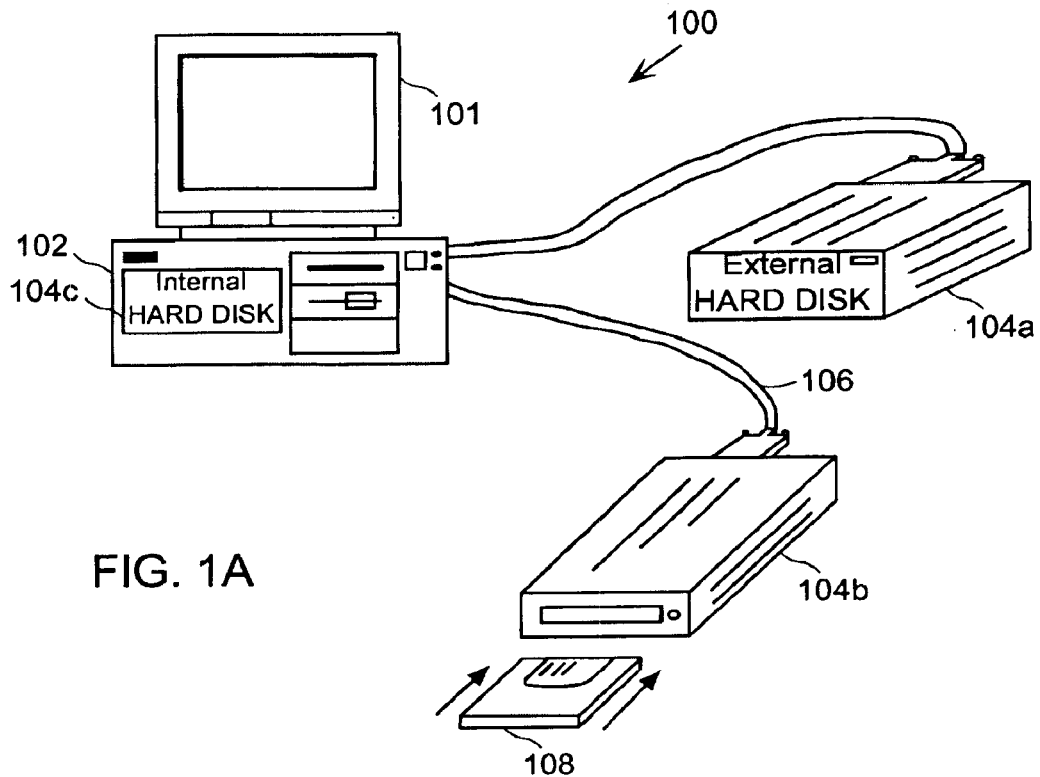
FIGS. 1A and 1B show simplified diagrams of a computer system being connected to a peripheral storage device in accordance with one embodiment of the present invention.

FIG. 1A shows a simplified diagram of a computer system 100 that includes a computer monitor 101 and a computer housing 102 that includes, among other standard hardware/software components, a central processing unit (CPU), memory (i.e., ROM and RAM), and a mother board having PCI slots. The computer housing 102 is shown connected to two exemplary peripheral storage devices, such as an external hard disk 104a and a removable media storage device 104b. The computer housing 102 typically includes a standard hard disk (not shown), and in one embodiment of the present invention, the computer housing 102 can also including an extra internal hard disk 104c. Although examples of three different types of peripheral storage devices 104a, 104b, and 104c are provided to illustrate the modularity of the intelligent backup and restore protection system of the present invention, only one extra peripheral storage device 104 is actually needed.

Figure 1B:
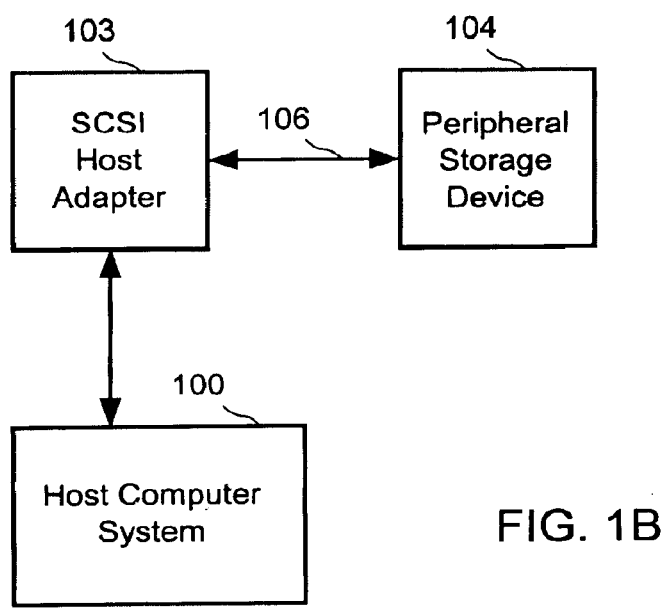

Preferably, the peripheral storage device 104 is connected to a SCSI host adapter 103 via a SCSI cable 106. As shown in FIG. 1B, the SCSI host adapter 103 is connected to a PCI bus slot of the host computer system 100, which enables connection to the peripheral storage device 104. In addition, the computer system 100 may include a CD-ROM drive (e.g., an ATAPI CD-ROM drive) which will facilitate the installation of the Genesis software components from a CD-ROM media. Of course, in another embodiment, the Genesis software may also be downloaded from an appropriate world wide web Internet site upon purchasing a suitable license.

Although other communication protocols can be used, SCSI communication links are preferred due to their fast speeds and simple to use modularity. In a preferred embodiment, the peripheral storage device 104 can be either a Jaz™ drive, which is available from Iomega Corporation of Roy, Utah, or a second hard disk drive (internal or external). When the peripheral storage device 104 is a Jaz™ drive, a cartridge 108 is preferably a Jaz™ drive cartridge or other suitable storage media cartridge that is capable of storing a large volume of data. Even though larger capacity media cartridges will be available in the future, present Jaz™ drive cartridges are available in 1 gigabyte (GB) and 2 gigabyte (GB) sizes, and either size may be used depending on the user's backup needs. Of course, larger drive cartridges are capable of storing more data.

The SCSI host adapter 103 is preferably a host adapter that is enabled with a special Adaptec, Inc. BIOS that allows users to boot up their computers from the peripheral storage device 104. The special Adaptec, Inc. BIOS is available on Adaptec's AHA-2930CU SCSI Host Adapter and other future host adapters, which are or may be available from Adaptec, Inc. of Milpitas, Calif. In this manner, when a hard disk failure occurs, the special Adaptec, Inc. BIOS will allow the user to boot from the peripheral storage device 104 and continue working until the failure is fixed. In a preferred embodiment, the cartridge 108 media (or the second hard disk) will not only contain valuable data, but also will include the user's operating system (OS) and other important software programs.

For example, when boot control is passed to the peripheral storage device 104, the user's system will boot to its preferred OS (i.e., Windows 95, Windows 98, or Windows NT) seamlessly. In this manner, users can run their programs, e.g., Microsoft Office™, receive and send e-mail, browse the Internet, access their important files, etc., just as if the system never experienced a hard disk crash. Of course, only those software applications selected for backup by the user will be available when booting to the peripheral storage device 104.

Figure 2:
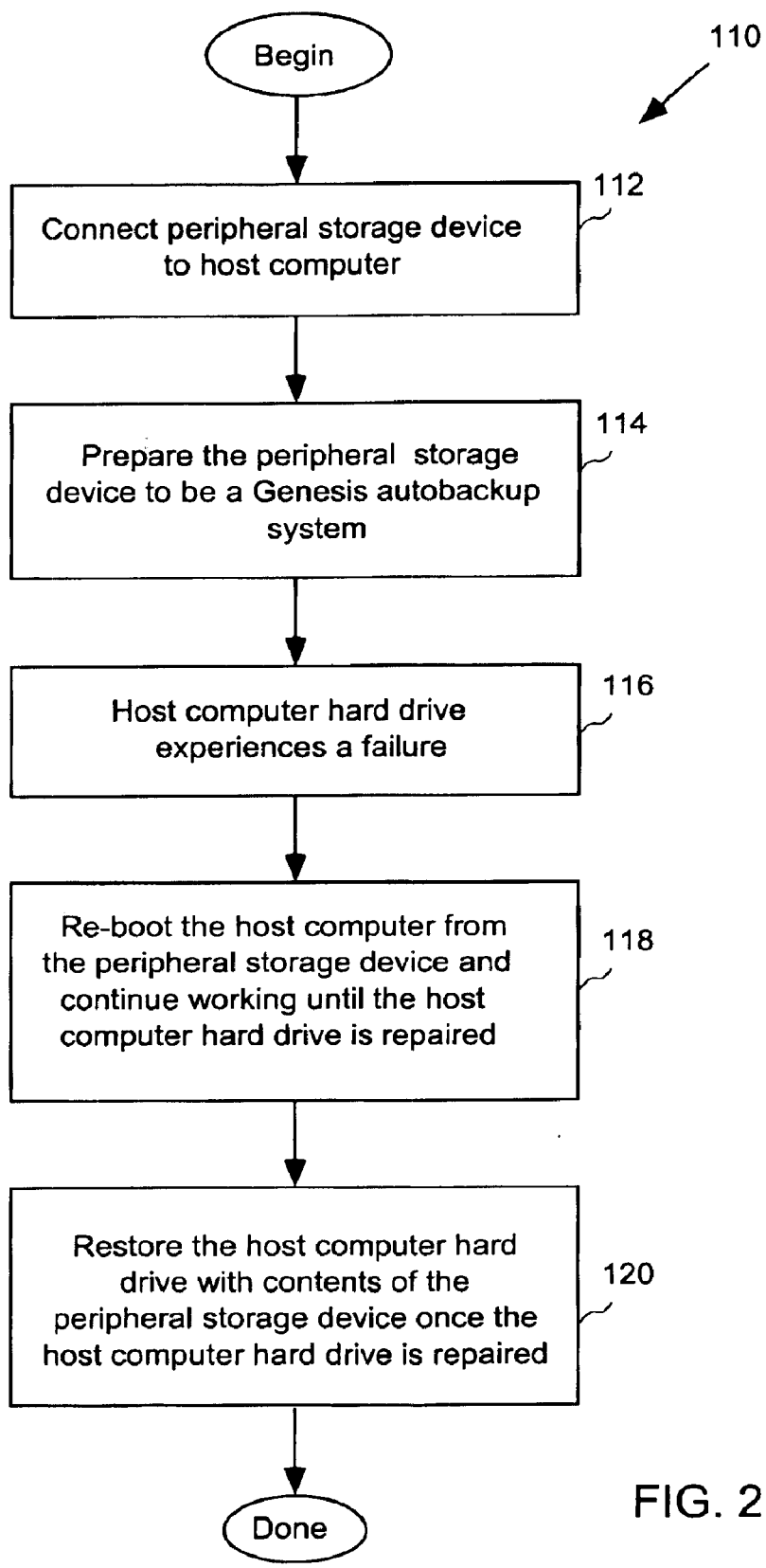
FIG. 2 shows a simplified flowchart diagram illustrating the intelligent backup protection provided by one embodiment of the present invention.

FIG. 2 shows a simplified flowchart diagram 110 illustrating the intelligent backup protection provided by one embodiment of the present invention. The method begins at an operation 112 where the peripheral storage device 104 is connected to the host computer system 110 via a suitable SCSI cable 106, that is connected to a SCSI host adapter. Once the peripheral storage device has been appropriately connected in operation 112, the method proceeds to an operation 114 where the peripheral storage device (i.e., the media of a cartridge or a hard disk) is prepared to be a Genesis-enabled backup system.

In the process of preparing the peripheral storage device to be a Genesis-enabled backup system, the peripheral storage device is first verified to be appropriately installed and connected to a suitable SCSI host adapter. As mentioned above, the SCSI host adapter is preferably an Adaptec AHA-2930CU SCSI host adapter that contains a special BIOS that enables the host computer system to be booted from the peripheral storage device 104, even if an EIDE hard drive is connected to the host computer system. The ability to boot the computer to a SCSI peripheral device is described in greater detail in U.S. patent application Ser. No. 09/016,764, filed on Jan. 30, 1998, and entitled "Method for Selectively Booting from a Desired Peripheral Device." This application, which is assigned to the assignee of the present application, is incorporated herein by reference in its entirety.

In an alternative embodiment, booting to a selected peripheral device may be accomplished without the need for the special BIOS. To accomplish the booting to the peripheral storage device in this alternative embodiment, a boot select program (BSP) code that is part of the Genesis software is used. In Table 1 below, an exemplary ABS (Adaptec boot select) and master boot record (MBR) layout in zero based logical block address (LBA) format is shown.

TABLE 1

ABS MBR Layout

| 0 | 1 | 2 | 3 | 4 | 5 | 6 | 7+ |
|---|---|---|---|---|---|---|---|
| [MBR] ABS 1 Image {Boot Management Code part 1} | Genesis Signature or Boot Signature | ABS 2 Image {Boot Management Code part 2-overflow from part 1 if needed} | | | | | |

In one embodiment, an installation program is used to generate ABS image codes and a signature that are stored on (i.e., written to) a primary boot drive media as shown in Table 1. As used herein, the primary boot drive is typically the EIDE drive (80h), which is used by the system during normal and default operation. In this example, the ABS 1 Image shown above is first loaded into memory and executed by the system BIOS. This code then loads the ABS 2 Image into system memory and transfers execution control to it. The ABS 2 Image shown above in Table 1 is configured to: (a) look for all Int 13h drives connected to the system; and (b) examine sector 0 (in LBA) of all Int 13h drives for a Genesis Signature or a Boot signature (to enable booting to the primary drive during normal operation). Preferably, the boot priority is determined by the following order to enable selection of one by the user:

1. Boot Signature;
2. Genesis Signature, if Boot Signature is not found; and
3. Primary boot drive, if neither the Boot Signature nor the Genesis signature is found.

Once the boot priority is determined, the decision concerning whether an Int 13h handler requires installation will have been made. If the desired boot drive is the primary boot drive (80h), then the desired boot drive does not have to install its own handler; otherwise, an Int 13h handler is installed to re-order the Int 13h drive numbers in the manner shown in Table 2 below.

TABLE 2

| System Default Environment | Boot Drive | ABS Controlled Environment |
|---|---|---|
| 80 h | Default | 81 h |
| 81 h | | 82 h |
| 82 h | Desired | 80 h |
| 83 h | | 83 h |

Once the boot drive has been identified and the Int 13h handler, if necessary, has been installed, the method loads the MBR of the desired boot drive and examines the partition table (the partition table is typically the last 66 bytes of the MBR sector, which has 512 bytes). If an active partition is not found, then the method must go back to find an alternate boot drive. If an active partition is found, then the method determines whether the partition requires Int 13h extension support by checking the partition type and whether the boot sector resides within the first 8.4 GB. If an Int 13h extension is not required to load the boot sector, then a regular Int 13h command is used to load the boot sector, to validate the boot sector by checking the signature, and to indicate whether the partition is bootable.

If an Int 13h extension is required to load the boot sector, then the method determines whether the Int 13h extension is supported. If the Int 13h extension is supported, then an Int 13h extension command is used to load the boot sector, to validate the boot sector by checking the signature, and to indicate that the partition is bootable. If the Int 13h extension is not supported, then the method must find an alternate boot drive.

After a bootable partition has been identified, a graphical user interface display, such as the example of Table 3 below, is provided to the user for selecting a drive from which to boot. Once the Genesis software is installed on a system, each time the system is booted, the display of Table 3 is provided to the user. If the computer is operating normally, then the user will usually select the designated boot drive (selection (1) in Table 3). In most cases, it is not until a crash or other failure has occurred with the designated boot drive (i.e., the primary boot drive) that the user will desire to boot from the Genesis drive (selection (2) in Table 3). In certain cases where the primary boot drive is completely inoperative, the user may not be able to take advantage of the special booting using the ABS code. In such cases, the user may rely on the special BIOS described above or, alternatively, may boot to a peripheral storage device using a special floppy disk that enables the selection of a desired drive from which to boot.

TABLE 3

Please Select (1) or (2) To Boot From.

1. Designated Boot Drive {Normal Operation}
2. Genesis Drive {Upon Failure}

If the selected boot drive has a bootable partition, then control is transferred to the code on the boot sector. If the selected boot drive does not contain a bootable partition, then the method must look for an alternate boot drive, as mentioned above, until a bootable partition is found. Although three specific ways in which booting to a desired peripheral device can be achieved when the primary hard drive is an EIDE drive (or other type of primary boot drive) are described herein, it will be apparent to those skilled in the art that other equivalent manners of booting to a desired peripheral storage devices can be used to achieve the benefits of the intelligent backup and restore system of the present invention.

Broadly speaking, the preparation 114 of the peripheral storage device 104 begins when the cartridge 108 is inserted (or an extra hard disk drive is connected), and the user implements a Genesis Preparation Wizard (i.e., in the form of a user friendly graphical user interface) to convert a standard cartridge media (or hard disk media) into a Genesis-enabled cartridge. At this point, the user will follow the Genesis Preparation Wizard and a SpareTire Wizard graphical user interface to generate a backup set using file-based copying and activate the intelligent Genesis backup system. After the peripheral storage device 104 and the host's Genesis software have been prepared to be a Genesis-enabled backup system, the method will proceed to an operation 116.

For purposes of this example, if the host computer system's hard drive experiences a failure in operation 116, then the Genesis-enabled backup system will be ready for the user to enable re-booting to the peripheral storage device 104, which will allow the user to continue working until the host computer hard drive is repaired in operation 118. The ability to continue working after the host computer system's hard drive has experienced a failure is a powerful feature that enables a user to maintain his or her productivity, even when the host computer system may have a serious problem that may require extensive work or complete replacement of the hard drive.

Next, the method proceeds to an operation 120 where the host computer hard drive will be restored (using the SpareTire Wizard) with the contents of the peripheral storage device 104 once the host computer hard drive has been repaired. This operation provides a user with the ability to revert back to work from the host computer's hard drive once this drive has been repaired. Thus, the method of the invention not only enables users to continue working without interruption when a host computer hard drive failure occurs, but also enables users to revert to working from the host computer hard drive once this drive has been repaired. These features are therefore powerful in that they substantially eliminate the loss in productivity experienced by users of today's complex and powerful computer systems when failures occur with a host computer hard drive.

Figure 3A:
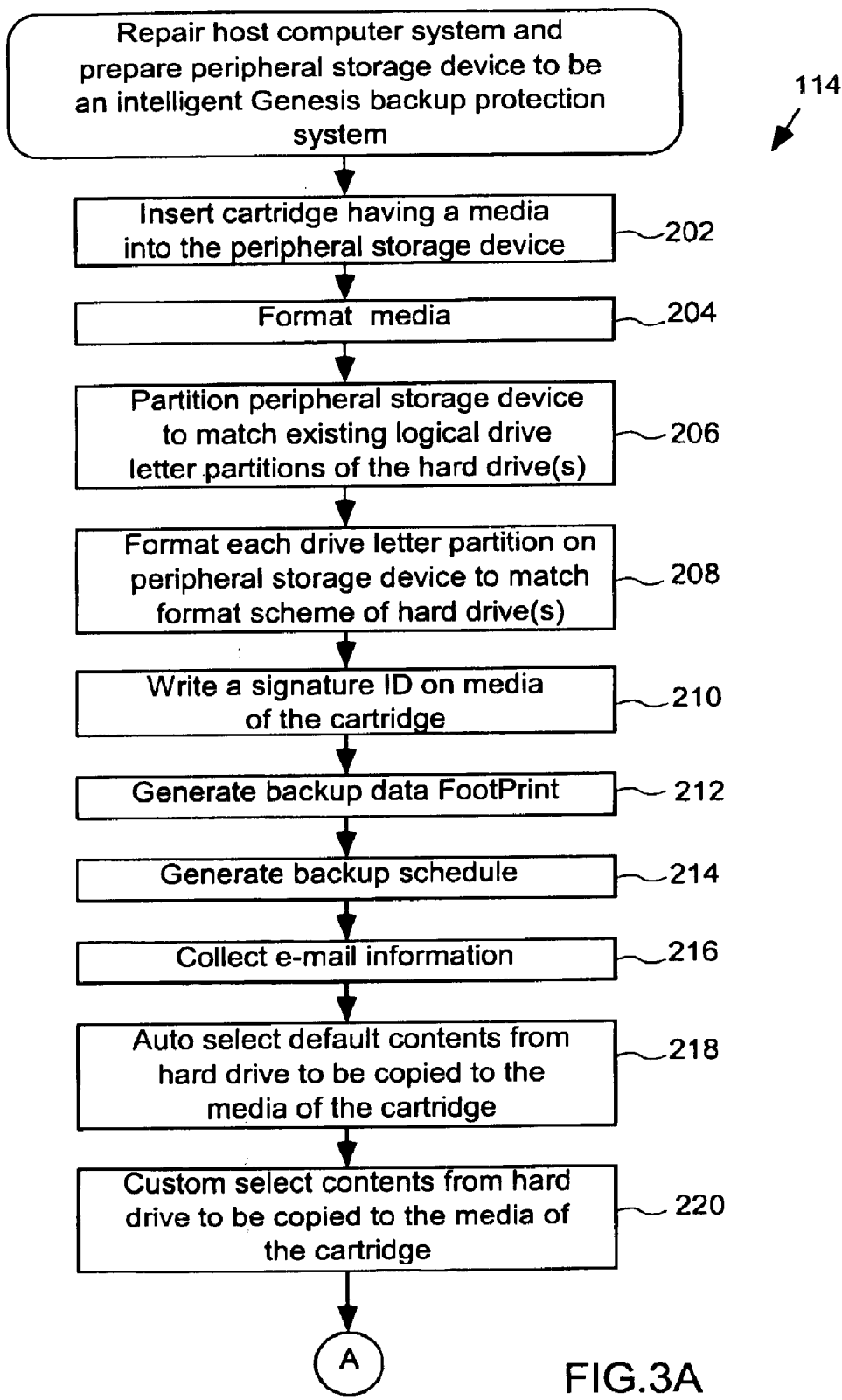
FIGS. 3A and 3B show more detailed flowchart diagrams of the method operations performed in preparing the host computer system and peripheral storage device to be an intelligent Genesis backup protection system in accordance with one embodiment of the present invention.

FIG. 3A shows a more detailed flowchart diagram 114 of the method operations performed in preparing the host computer system and peripheral storage device to be an intelligent Genesis backup protection system in accordance with one embodiment of the present invention. In the following examples, it will be assumed that the selected peripheral storage device is the Jaz™ drive, however, these examples are equally applicable to situations in which the selected peripheral storage device is a second hard disk drive.

The method begins at an operation 202 where a cartridge having a storage media is inserted into the peripheral storage device. As mentioned above, the cartridge is preferably an Iomega Jaz™ drive cartridge, which is capable of storing a large amount of data. Of course, other suitable peripheral storage devices and cartridges also may be used with appropriate modifications. Once the cartridge has been inserted into the peripheral storage device, the method proceeds to an operation 204 where the storage media is formatted.

After the media has been formatted, the peripheral storage device media is partitioned to match existing logical drive letter partitions of the hard drive or drives of the host computer system. The method then proceeds to an operation 208 where each drive letter partitioned on the peripheral storage device media is formatted to match the format scheme of the hard drive(s). Once formatted, the method proceeds to an operation 210 where a Genesis signature ID is written on the media of the cartridge. Preferably, the signature ID is written in one or more sectors after the master boot record (MBR) sector of the media. The signature ID will therefore identify this particular cartridge as being a Genesis-enabled cartridge, which, when inserted into the peripheral storage device and detected by the computer's host adapter BIOS, indicates that the intelligent backup is able to commence.

On the other hand, if a non-Genesis-enabled cartridge (i.e., one not prepared in the manner set forth above) is inserted into the peripheral storage device, then the peripheral storage device will operate normally without performing the intelligent backup protection. Alternatively, in the event the peripheral storage device is a second hard disk drive, the intelligent backup and restore protection system will generally be in a ready state. The method now proceeds to an operation 212 where a backup data FootPrint image file is generated. This initial FootPrint image file is referred to herein as a "before image." In general, the FootPrint image file is configured to detect and list all hardware (i.e., hard drives and controllers). In this manner, the intelligent Genesis backup protection system will be able to troubleshoot what the source of a failure may be (i.e., to determine which hard drive may have failed). Specifically, when a failure occurs, a new FootPrint image file is created. This FootPrint image file is referred to as an "after image."

By comparing the "before" and "after" image files, the intelligent Genesis backup system will either know or, at a minimum, be in a position to narrow down the cause of a failure. This enables the intelligent Genesis backup system to take appropriate actions to repair the problem (or to suggest a solution). After the backup data FootPrint image file is generated in operation 212, the method proceeds to an operation 214.

In operation 214, a backup schedule is generated. In this operation, users will have the option of selecting when incremental backups will occur during normal operation. Some of the options will include performing the incremental backups during startup, shut down, screen saver periods, or periods of inactivity. As used herein, an "incremental" backup means that only those files or data that are newer than that previously backed up will be backed up again. The use of such incremental backups is beneficial because it eliminates the need for long backup sessions. The custom scheduling of the backup operations also enables users to set up the backups for when it is most convenient to the individual user, depending on his or her work habits.

Once the backup schedule is generated in operation 214, the method proceeds to an operation 216 where the intelligent Genesis backup protection system will prompt the user to provide an e-mail address for his or her computer support personnel. In this manner, if a failure occurs with the host computer system's hard drive (or some type of system failure), then the intelligent Genesis backup protection system will automatically send an e-mail message to the computer support personnel to inform them that the hard drive of the computer system has experienced a failure. In addition, the e-mail message may provide an indication as to the source of the problem. Once the e-mail information has been collected in operation 216, the method proceeds to an operation 218.

In operation 218, default contents from the hard drive are auto selected to be copied to the media of the cartridge. In this operation, the auto selected contents will typically include the standard boot files that are critical to the booting process and operating system files. The method then proceeds to an operation 220 where contents from the host computer system's hard drive are custom selected to be copied to the media of the cartridge. In this operation, the user is provided with a Genesis X-file viewer interface, which provides the user with a Windows Explorer-like directory of the hard drive's data. From this user friendly interface, the user is allowed to select (i.e., by checking a box or the like) which files will be tracked for incremental backups by the intelligent Genesis backup protection system.

Figure 3B:
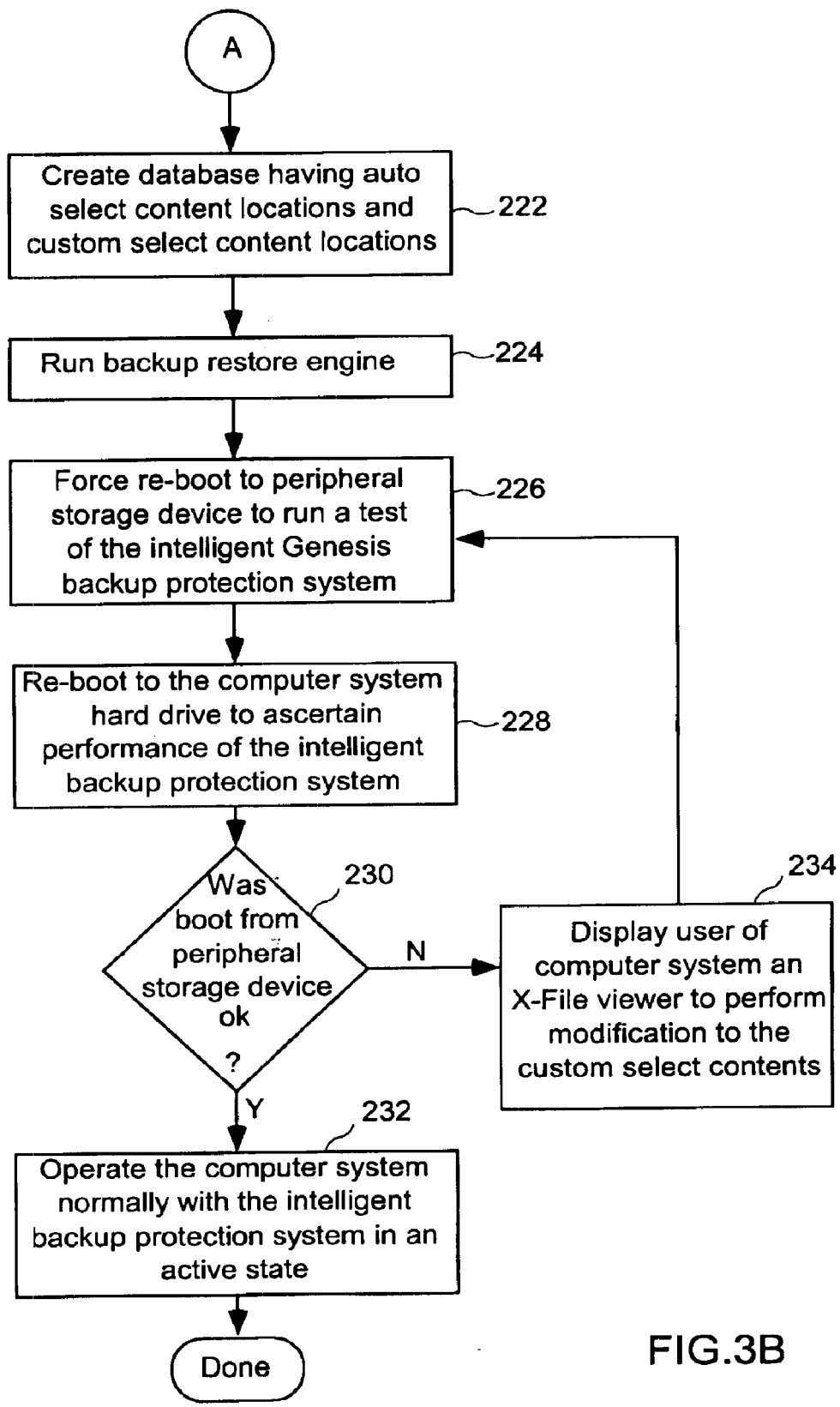

In one embodiment, if the host computer system's hard drive is smaller than the capacity of the cartridge media, then the user may choose to make a complete replica of the entire contents of the hard drive. In this manner, when a computer failure occurs, the user will be able to continue working from the identical contents of the peripheral storage device while the computer system's hard drive is repaired. From operation 220, the method proceeds to a pointer A as shown in FIG. 3B.

Once the contents of the initial backup set have been selected, a database having the auto selected content locations and custom selected content locations is created in operation 222. This database is generally a text file having pointers to the various selected applications and files that are on the computer system's hard drive. In one embodiment, the aforementioned X-file viewer is responsible for generating the database, which is constructed using the custom selected data.

When the X-file viewer has created the database, the method proceeds to an operation 224 where a backup restore engine is run. The backup restore engine is configured to copy all of the information that is selected in the database to the media of the peripheral storage device. In general, the backup restore engine is responsible for handling the file-based copying process from the user source drive(s) to the peripheral storage drive, as well as from the peripheral storage drive to the user's hard drive. The basic operation of the backup restore engine includes receiving paths to the files (called the source) and copying them to the proper backup and restore location (called the destination). File-based copying is a powerful feature that enables copying data between media having different sizes, configurations, and operating standards. In addition to the basic copying process, this engine is responsible for maintaining file attributes after being copied (e.g., hidden files will remain hidden on the destination drive).

The backup restore engine is also capable of maintaining security attributes for files under NTFS. In general, to ensure that older files do not overwrite newer files, the engine is also configured to avoid copying files if the destination is newer than the source. The backup restore engine is also charged with performing virus checking on all files before the copying is performed. In this manner, any detected viruses are disinfected prior to performing any copying operations.

From operation 224, the method proceeds to an operation 226 where a re-boot to the peripheral storage device is forced to run a test of the intelligent Genesis backup protection system. As mentioned before, the peripheral storage device may be a Jaz™ drive (or a second hard drive) that is connected to the computer via a SCSI cable and a SCSI host adapter. Next, the method proceeds to an operation 228 where the computer system is again re-booted to the computer system's hard drive to ascertain the performance of the intelligent backup protection system.

The method now proceeds to a decision operation 230 where it is determined whether the boot from the peripheral storage device was O.K. If the booting to the peripheral storage device was O.K., then the method proceeds to an operation 232 where the computer system is allowed to operate normally with the intelligent Genesis backup protection system in an active state. In general, the intelligent backup protection system will work automatically in the background without disturbing the user during normal operation.

Referring back to operation 230, if the boot from the peripheral storage device was not O.K., then the user is provided with an X-file viewer to enable the user to perform modifications to the custom selected contents for backup in operation 234. Once the user has made the appropriate modifications to the selected contents, the method will again proceed to operation 226 where re-booting to the peripheral storage device is again forced to run a test of the intelligent Genesis backup protection system. Once the boot from the peripheral storage device has been determined to be O.K. in operation 230, the method will then proceed to operation 232 and thereafter the method will end.

Figure 4:
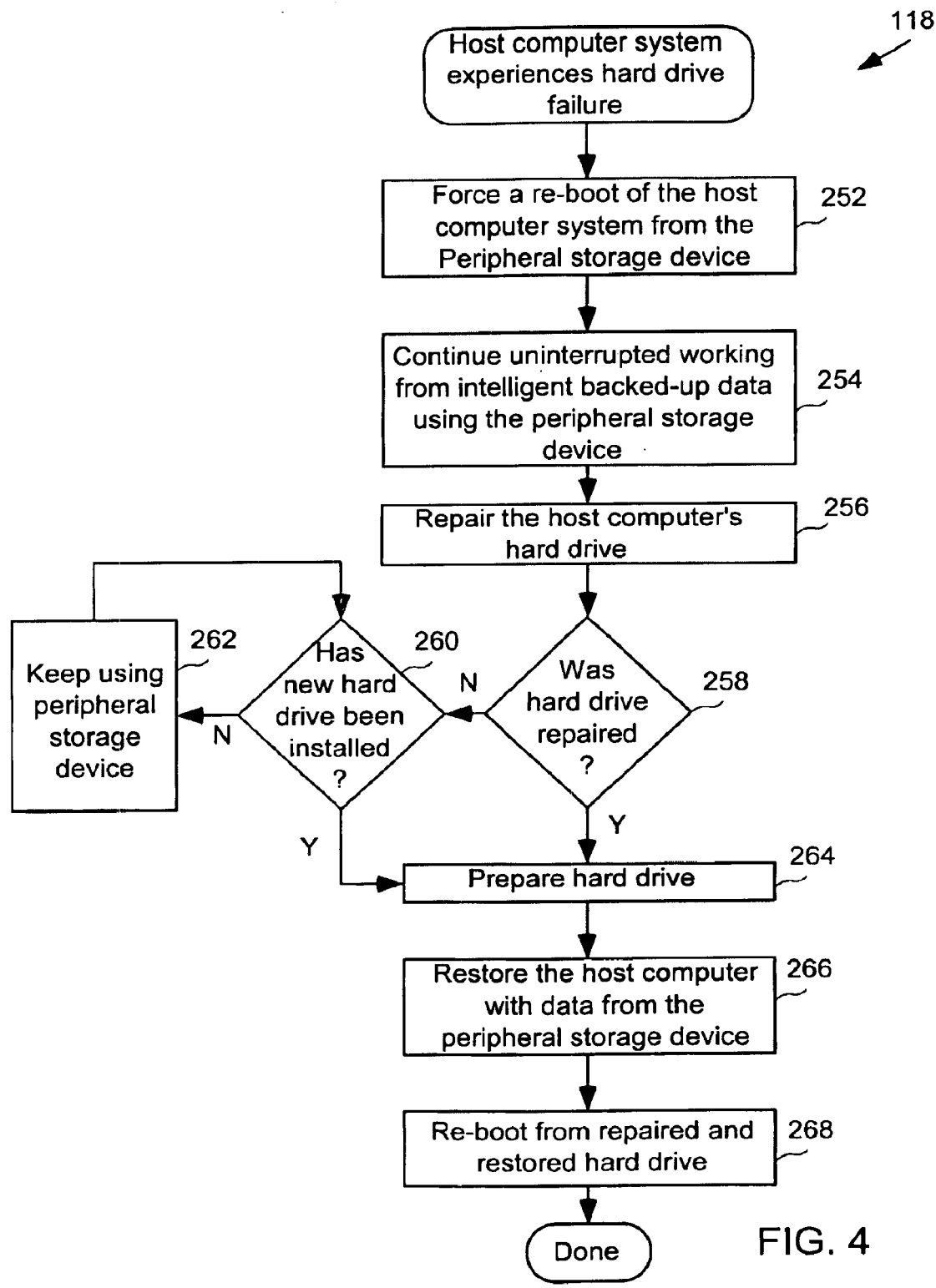
FIG. 4 shows a more detailed flowchart diagram illustrating the operations performed by the intelligent Genesis backup protection system when the host computer system experiences a hard drive failure in accordance with one embodiment of the present invention.

FIG. 4 shows a more detailed flowchart diagram 118 illustrating the operations performed by the intelligent Genesis backup protection system when the host computer system experiences a hard drive failure. The method begins at an operation 252 where the intelligent Genesis backup protection system will automatically prompt the user (via a graphical user interface or text) to re-boot the host computer system from the peripheral storage device, if desired, upon experiencing the hard drive failure which is detected by a system BIOS. Once re-booted to the peripheral storage device, the method will proceed to an operation 254 where the user can continue uninterrupted working from the intelligently backed-up data using the peripheral storage device, as if no failure had occurred. While the user is working uninterrupted from the intelligently backed-up data of the peripheral storage device, the method will proceed to an operation 256 where the host computer's hard drive will be repaired.

Next, the method will proceed to a decision operation 258 where it is determined whether the hard drive was repaired. If it has not been repaired, the method will proceed to another decision operation 260 where it is determined whether a new hard drive has been installed. If a new hard drive has not been installed, the method will proceed to an operation 262 where the user will keep using the peripheral storage device until the hard drive is repaired or replaced. When the hard drive is repaired or replaced, the method will proceed to an operation 264 where the new hard drive or repaired hard drive is prepared.

The preparation of a new hard drive generally involves partitioning the hard drive in the state it was originally in (i.e., to match the partitions of the peripheral storage device media), and then formatting the hard drive to its original state. Once the hard drive is prepared in operation 264, the method will proceed to an operation 266 where the host computer is restored with the data from the peripheral storage device media. As mentioned above, the restoring operation includes copying the data stored on the peripheral storage device media back to the repaired hard drive of the computer system. Once the restoring has been completed in operation 266, the method proceeds to an operation 268 where the computer system is re-booted from the repaired and restored hard drive. At this point, the method is done.

Figure 5A:
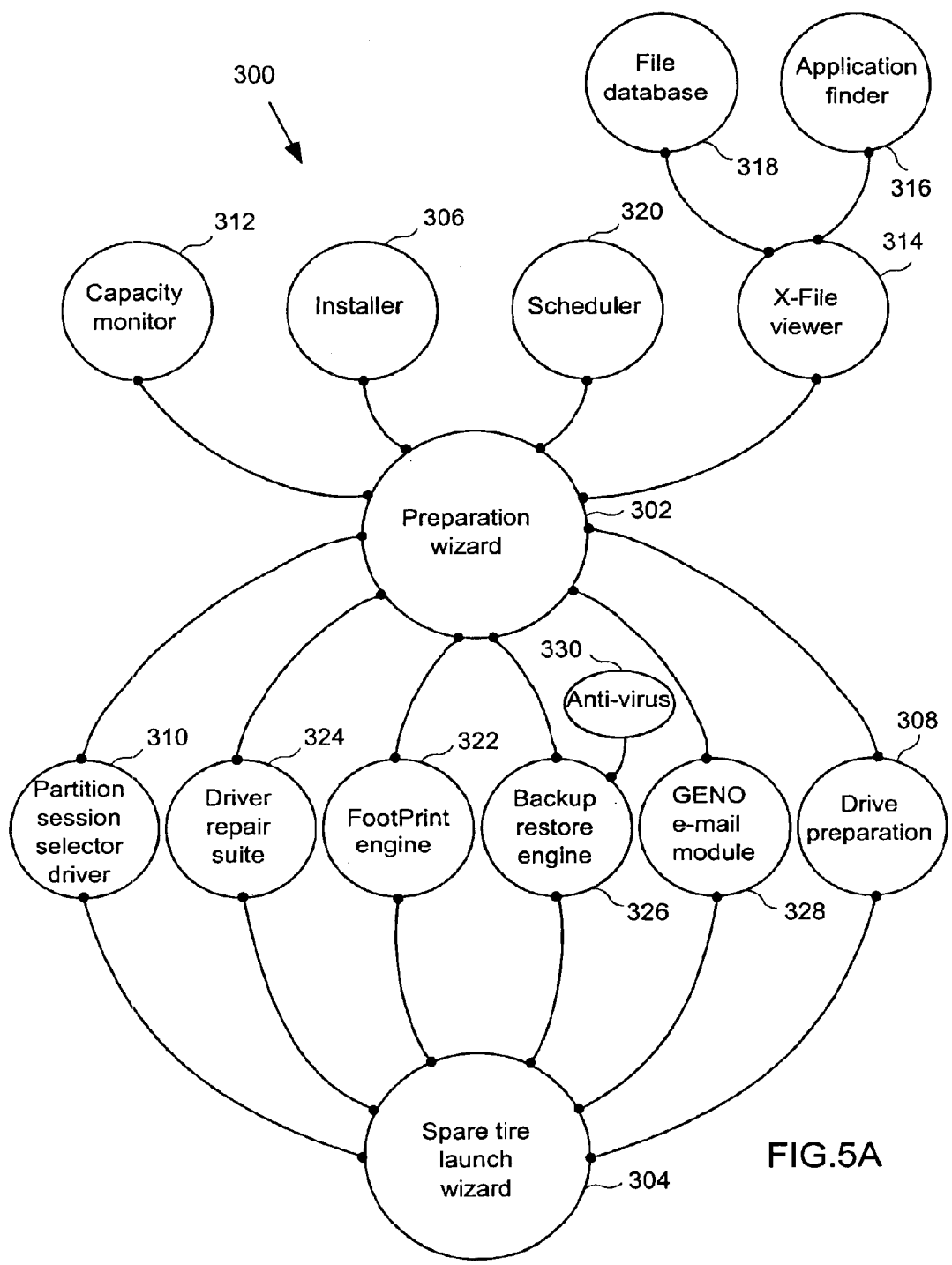
FIG. 5A shows an object representation of software modules and their communication with other modules of the system in accordance with one embodiment of the present invention.

FIG. 5A shows a software object representation 300 in accordance with one embodiment of the present invention. The software object representation illustrates the interactions between the main software components of the intelligent Genesis backup protection system. The two main components of the software object representation 300 include a Genesis Preparation Wizard 302 and a SpareTire Launch Wizard 304. The Preparation Wizard 302 is a software interface which will interact with various software modules to prepare the host computer system and a peripheral device media to be Genesis enabled.

On the other hand, the SpareTire Launch Wizard 304 is used to enable the user to boot from and work off of the backed-up data after an error or failure occurs with the host computer system's hard drive. As shown, the SpareTire Launch Wizard 304 also interacts with various software components as does the Preparation Wizard 302. In this example, the Preparation Wizard 302 is configured to communicate with an installer object 306, which is configured to handle the installation and verification of various registry entries created during the Genesis software installation process. If any keys are missing, then the installation object 306 will suggest to the user via the Preparation Wizard 302 that a re-installation is required.

In addition, the installer object 306 is configured to check whether an appropriate peripheral storage drive is connected to a suitable SCSI host adapter. If the Preparation Wizard 302 is unable to detect the special BIOS from the SCSI host adapter that enables booting to the SCSI peripheral device, then the Preparation Wizard 302 will notify the user and explain to the user how an upgraded BIOS can be obtained. As mentioned above, the detailed functionality of this special BIOS is described in U.S. patent application Ser. No. 09/016,764, filed on Jan. 30, 1998, the disclosure of which is incorporated herein by reference.

The Preparation Wizard 302 is also in communication with a drive preparation object 308. The drive preparation object 308 is responsible for preparing the peripheral storage device to be a Genesis-enabled system. The preparation generally includes partitioning the media of the peripheral storage device, formatting the partitions, and writing the Genesis signature ID to the media. Generally, the peripheral storage device media will be partitioned to match the number of logical drive letter partitions of the host computer system hard drive(s). The drive preparation object 308 is also charged with preparing a new hard disk when the computer system's hard disk is not repairable, and a new hard disk is installed when the SpareTire Launch Wizard 304 is in control.

The preparation of a new hard disk typically includes detecting that a new hard disk is installed (i.e., which is possible because of the Footprint image file), verifying the physical media, partitioning, and formatting. To detect a new hard disk, the SpareTire Launch Wizard 304 will search for a matching entry in the FootPrint image file and, when detected in the FootPrint image file, this matching entry will indicate that a new device has been added (i.e., the new hard disk). Using this method, it is also possible to detect all other properties of the device, which are attached to the new entry in the Footprint image file.

In one embodiment, the partitions of the host computer system are those defined by drive letters of a Windows-type operating system (OS). In this embodiment, the partitioning may be performed by using a GUI partitioning utility, such as one provided as part of an Adaptec, Inc. EZ-SCSI program, which is available from Adaptec, Inc. of Milpitas, Calif. During the initial drive preparation, the peripheral device storage media may be erased to ensure that all data is removed before the media is identified to be a Genesis-enabled media. In addition, the drive preparation object 308 will be configured to verify the media. The media may be verified by scanning the entire media surface on a sector-by-sector basis. Bad sectors will be noted in the file allocation table (FAT) when the disk is formatted so that they are not used for backup. During formatting, the drive may be formatted to FAT-16 for Windows 95/98 and Windows NT. For Windows 95/98 OSR-2 configurations, formatting to FAT-32 will also be an option for the user. In addition, NTFS will also be available for Windows NT.

Figure 5B:
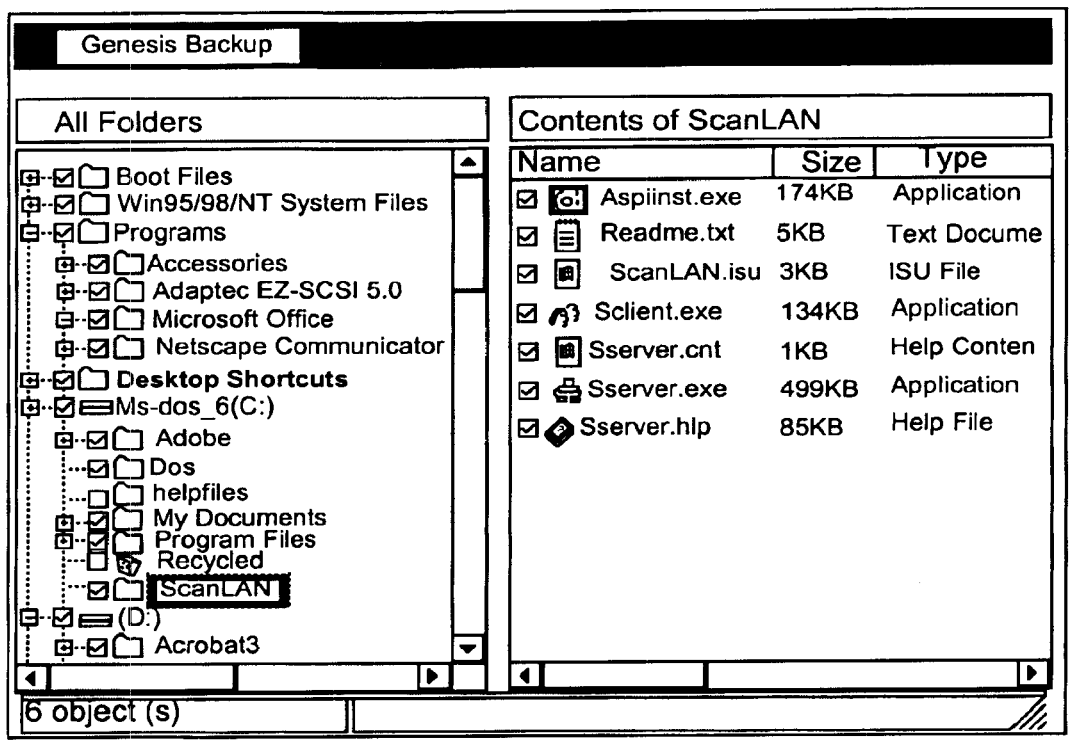
FIG. 5B is an exemplary graphical user interface of an X-file viewer in accordance with one embodiment of the present invention.

The Preparation Wizard 302 is also coupled to an X-file viewer 314 which allows the user to select which programs and files are to be incrementally backed up by the intelligent Genesis backup protection system. In FIG. 5B, an exemplary X-file viewer is shown having selection boxes next to those programs, folders, and files that are to be backed up by the intelligent backup system. In this example, the boot files and the Windows 95 system files are automatically selected by default to be backed up by the intelligent backup system. However, the user is allowed to selectively identify and check those boxes for programs, folders, and files that also are to be backed up by the intelligent backup system. Additional details regarding the X-file viewer are set forth below with reference to FIGS. 5C–5F.

The Preparation Wizard 302 is further shown in communication with a capacity monitor 312, which is charged with ensuring that no more than an allowed amount of data is targeted for certain partitions of the peripheral storage device media. In general, the capacity monitor 312 will ensure that only a percentage of each partition will be allocated when the user is selecting programs for the intelligent backup operations of the Genesis system. In this manner, enough space remains in each partition for subsequent incremental backups during normal operation.

Eventually, however, one or more of the partitions of the peripheral storage device will become filled. At that time, the user will be required to perform a refresh of the peripheral storage device media, which is substantially similar to the initial backup. Upon the refresh operation, newly calculated partition sizes are made to provide additional space on each of the partitions for more incremental backups.

Once the user has implemented the X-file viewer 314 to select those programs, files, and folders that should be incrementally backed up, a file database 318 will be generated by the X-file viewer. The file database will essentially be a list of those selected items and their locations on the various local logical drive letters of the computer system. The X-file viewer 314 is also in communication with an application finder 316 that enables the X-file viewer to find those programs (and all associated components) which are logically contained within the various partitions and associated drives as shown in FIG. 5B.

The Preparation Wizard 302 is also in communication with a scheduler 320, which will provide a user the option of selecting when the incremental backups are to occur. As mentioned above, some of the options will include backing up at startup, shutdown, during a screen saver period, or even during operation. In this embodiment, the incremental backups are responsible for updating the peripheral storage device media when stored files have been modified since the last backup to reduce the amount of time spent during backup sessions.

The Preparation Wizard 302 is also in communication with a FootPrint engine 322, which is configured to detect and list all hardware components in a FootPrint image file to identify the source of the failure that resulted in the booting to the peripheral storage device media. As mentioned above, this FootPrint image file is created and copied to the peripheral storage media during the initial backup, after each boot to a normal working system, and with each incremental backup operation. In one embodiment, the FootPrint image file will contain the items identified in Table 4 below.

TABLE 4

Operating System

Version
Location
List of Peripherals

Device indexes (e.g., DEVICE00) referencing another part of the footprint file containing detailed information about the corresponding device.
  Registry path of device
  Hardware device address (e.g., SCSI target/LUN or IDE master/slave)
  "Inquiry" data including vendor, model and revision
  Partition data (i.e., size, type, file-system)
  Drive-letter mappings
Controller Cards Controller indexes (e.g., CONTROLLER00) referencing another part of the footprint file that contains detailed information about the corresponding controller.
  Type (e.g., EIDE/SCSI)
  Configuration information (e.g., I/O Port, IRQ, DMA, etc.)
  List of attached devices (reference to peripheral section)
Time stamp (e.g., when was the FootPrint image created)

A majority of the information in Table 4 will come from the system registry. As such, this information is relatively easy to compile because there is no need to probe hardware. This information is then written to a FootPrint image file in text format each time a successful boot occurs to the operating system. A copy of this file is stored in the root directory of the hard drive that contains the operating system as well as in the root directory of the peripheral storage device (i.e., Jaz™ drive or second hard disk drive). As mentioned above, when the peripheral storage device becomes the boot device, this FootPrint image file is analyzed and compared to a newly created FootPrint image file to determine which device has failed (or which devices have failed). The SpareTire Launch Wizard 304 uses this information to inform the user of the failure and to suggest a possible course of action to repair the problem.

Another application of the FootPrint image file is one in which new drives are automatically detected for the user. Each time the system is booted, the previous FootPrint image file (before image) is compared to the newly created FootPrint image file (after image). If additional devices are detected, then the intelligent Genesis backup protection system may notify the user of the new device or devices and, if desired, proceed to partition and format the new media.

As shown, the SpareTire Launch Wizard 304 is in communication with a drive repair suite 324. The drive repair suite 324 is the mechanism by which minor hard drive failures can be repaired to avoid complete replacement of the failed hard drive. The drive repair suite 324 will be initiated only after a failure has occurred with the host computer system's hard drive and a boot to the peripheral storage device has occurred. The drive repair suite 324 is capable of performing a master boot record (MBR) boot sector repair, file system repair, a media scan for defects, and virus scans. The MBR boot sector repair is performed when a hard drive is no longer bootable because its MBR or boot sector has become corrupt. In such a case, the data is still intact, but the drive is no longer bootable. By repairing the MBR, the drive can once again become bootable.

Additionally, the file system repair may include checking an existing file system structure. This advantageously provides an added level of advanced user functionality. If the file system is corrupt, then an attempt can be made to fix it by examining the file system data structures and performing sanity checks. If a fix is possible, then the user will be notified of such and the fix will be attempted. However, in certain circumstances, if the file system is corrupt, then the drive will generally have to be reformatted. The drive repair suite 324 is also capable of communicating with an operating system's ScanDisk™ program. The ScanDisk™ program can verify the media on the hard drive to determine its condition. In some cases, bad sectors can be mapped out.

A backup restore engine 326 is also provided in communication with the SpareTire Launch Wizard 324. The SpareTire Launch Wizard 324 may then access the backup restore engine 326 to copy those files that are stored in the peripheral storage device media back to a repaired host computer hard drive. As mentioned above, the backup restore engine 326 is responsible for handling the file copying process from the user's source drives to the peripheral storage device media as well as from the storage device media to the user's hard drive. During the initial backup to the peripheral storage device, the data is first passed through an anti-virus module 330 to prevent copying of infected items. Once the virus scan has been completed, the information is verified before being transferred to the peripheral storage device media.

Also provided is a Genesis E-mail Notification Object (GENO), which is responsible for sending an e-mail notification to the computer support staff when the computer system goes down, and the SpareTire Launch Wizard 304 is initiated.

A partition session selector driver 310 is also provided. The partition session selector driver 310 is in communication with the Preparation Wizard 302 to enable it to select each partition of the peripheral storage device media one at a time, after it has been partitioned by the drive preparation object 308. In this embodiment, the ability to select one of the partitions is needed when there is more than one partition associated with the hard drive(s). For example, if the user has a hard drive with two partitions, C: and D:, and a CD-ROM is E:, then the Genesis drive will be assigned F:. Even though the Genesis drive will have two partitions, one for C: and one for D:, it will be viewed as only one partition (i.e., partition F:). The partition session selector driver 310 functionality will be described in greater detail below with reference to FIGS. 10B through 10E.

Figure 5C:
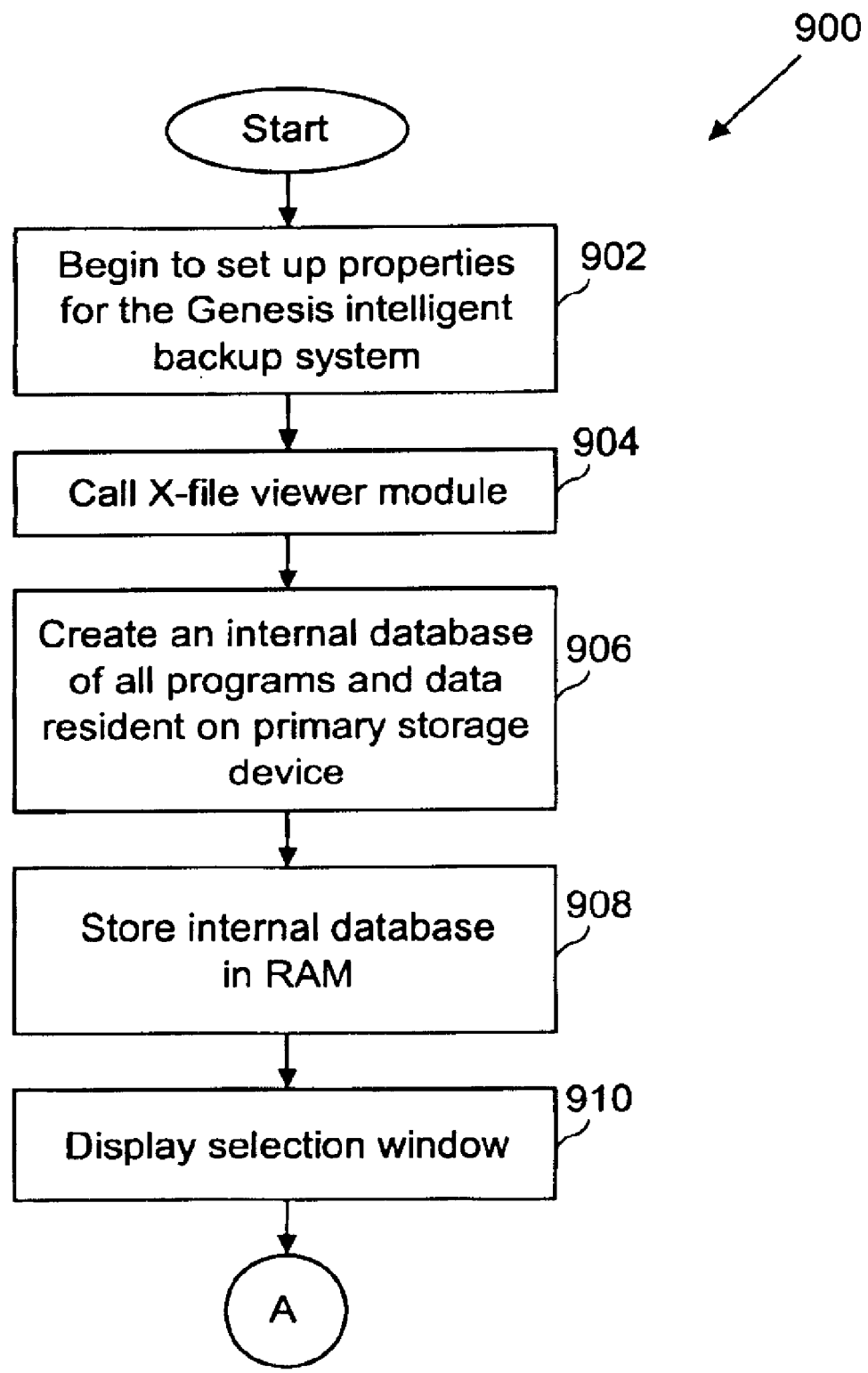
FIGS. 5C and 5D show a detailed flowchart diagram illustrating the method operations performed in generating a database for use in the Genesis intelligent backup system in accordance with one embodiment of the present invention.

The X-file viewer 314 (see FIG. 5A) and its functionality will now be described in more detail with reference to FIGS. 5C–5F. In one embodiment, the X-file viewer is an ActiveX control that displays a list of files read from the primary storage device, e.g., hard drive, of the host computer system to collect information for a database file that will be used in the backup system. FIG. 5C shows a detailed flowchart diagram 900 illustrating the method operations performed in generating a database for use in the Genesis intelligent backup system in accordance with one embodiment of the present invention. The method begins in operation 902 in which the set up of the Genesis application begins. In operation 904, which occurs during the process in which the properties of the Genesis application are being set up, a call is made to initialize the X-file viewer module. Once it is initialized, the X-file viewer creates an internal database of all programs and data resident on the primary storage device in operation 906. This internal database may be created by scanning the host computer system in accordance with known techniques. In one embodiment, the scan of the host computer system starts with the C: drive and information is added to the internal database on a first-come, first-serve basis. In this embodiment, the scan includes up to 5 logical drive letters. If desired, however, more than 5 logical drive letters may be scanned. The database is preferably in the form of a standard linked list structure; however, other suitable database structures also may be used.

Next, in operation 908, the internal database is stored in memory, e.g., random access memory (RAM). The method then proceeds to operation 910 in which a selection window is displayed to enable a user to select the programs and associated data that will be available for use in the backup system. An exemplary graphical user interface for the selection window is described below with reference to FIGS. 5E and 5F; however, those skilled in the art will recognize that any suitable graphical user interface may be used. Once the selection window is displayed, the method proceeds to a pointer A.

Figure 5D:
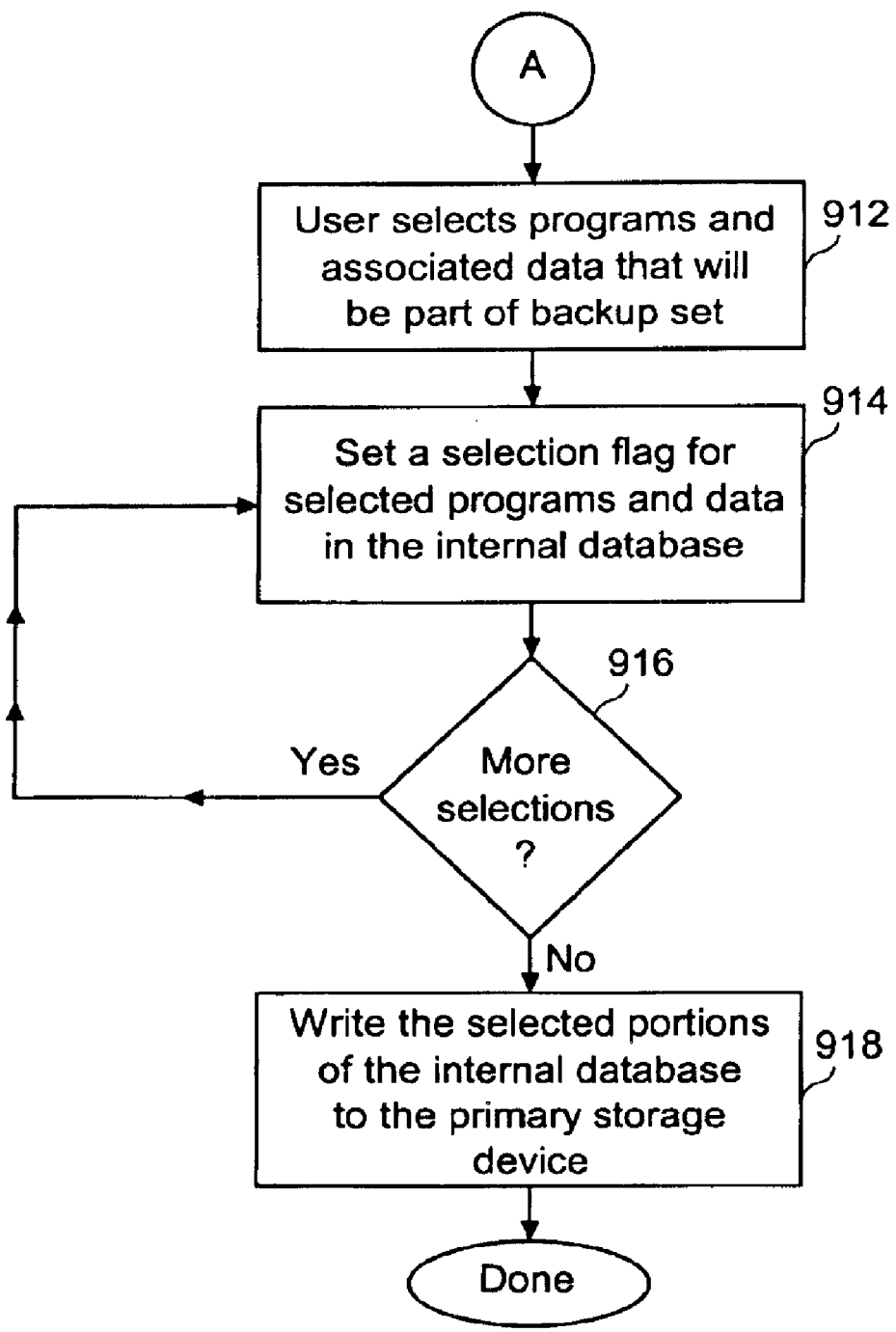

With reference to FIG. 5D, the method proceeds from the pointer A to operation 912 in which the user selects programs and associated data to define a backup set, which will be available for use in the backup system. This selection operation may be implemented by displaying a check box, radio button, or other suitable graphic object proximate to each item shown in the selection window. To select an item for inclusion in the backup set, the user clicks on the check box. When an item, i.e., program or associated data, is selected for inclusion in the backup set, the method sets a selection flag for that item in the internal database in operation 914. The method then proceeds to decision operation 916 where it is determined whether an additional selection will be made. If an additional selection is made, then the method proceeds back to operation 914 and sets a selection flag for the selected item in the internal database. If another selection is not made, then the method proceeds to operation 918. To enable the user to signal the end of the selection process, the selection window may include a "Next" button, as described in more detail below. In operation 918, the selected portions of the internal database are written to the primary storage device. In one embodiment, the selected portions of the internal database are written to a "Genesis.dat" file that is placed in the Genesis directory on the primary storage device. A sample "Genesis.dat" file is set forth below in Table 5. Once the selected portions of the internal database are written to the primary storage device, the method is done.

Figure 5E:
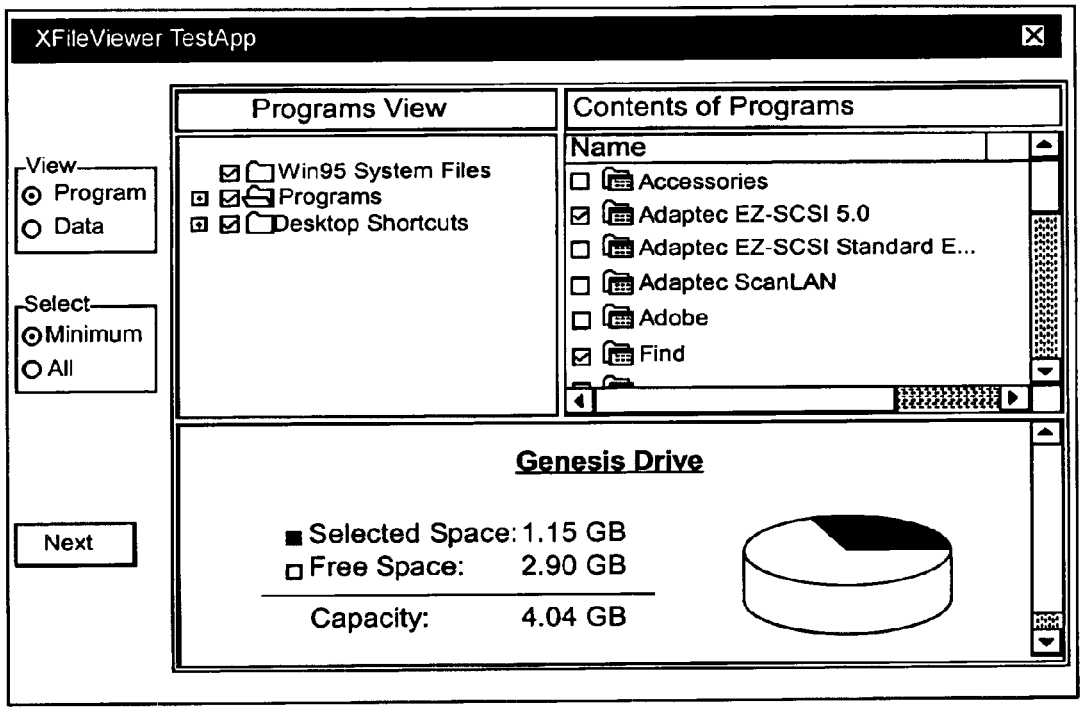
FIG. 5E is a screenshot illustrating a "Programs" view of an exemplary graphical user interface in accordance with one embodiment of the invention.
Figure 5F:
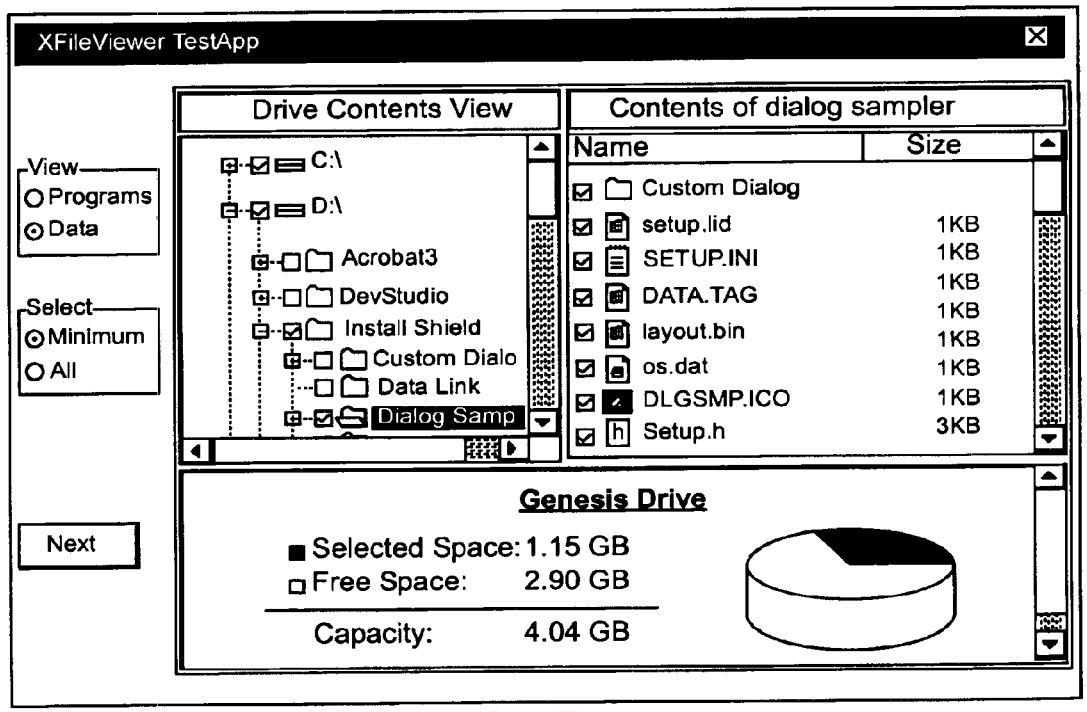
FIG. 5F is a screenshot illustrating a "Data" view of an exemplary graphical user interface in accordance with one embodiment of the invention.

FIGS. 5E and 5F are exemplary screenshots illustrating one graphical user interface for the selection window. This graphical user interface includes two views: a "Programs" view and a "Data" view. FIG. 5E shows an exemplary screenshot illustrating the "Programs" view. This view displays a list of the programs currently installed on the host computer system using a split window approach containing a Tree View control and a File View control. The list of programs includes the "Start\Programs" menu and any other programs installed to the root of the "Start" menu. Thus, the list includes programs that appear on the user's desktop as shortcuts. Among others, these programs typically include Microsoft Word, Microsoft Excel, e-mail, and Internet applications. The "Programs" view enables a user to select a program for inclusion in the backup set without knowing where the program is originally installed on the host computer system. This functionality is provided by communicating with application finder module 316 (see FIG. 5A). The application finder module provides the full path name for each selected program, as described in more detail below with reference to FIGS. 5G and 5H.

FIG. 5F shows an exemplary screenshot illustrating the "Data" view. This view displays a list of the logical hard drives together with all files on the host computer system using a split window approach containing a Tree View control and a File View control. The information included in this list is similar to that contained in the Windows Explorer directory, with the exception that the hidden and system attributes of the files are not displayed. In one embodiment, when the user selects a directory all the files that belong to the selected directory are automatically included in the backup set. In this embodiment, there are 3 states of the check box associated with each item shown in the selection window: not selected, selected, and partially selected. In the not selected state, all subdirectories and files are not selected. In the selected state, all subdirectories and files are selected. In the partially selected state, some subdirectories and files are not selected.

As shown under the heading "View" in FIGS. 5E and 5F, the selection window includes a pair of radio buttons that enable the user to select either the "Programs" view or the "Data" view. As shown under the heading "Select" in FIGS. 5E and 5F, the selection window further includes a pair of radio buttons that enable the user to select either a minimal or maximal backup set. The minimal backup set, which is selected by clicking the radio button labeled "Minimum," includes information concerning the operating system (OS) files, e.g., Windows 95 or Windows NT OS files, as well as boot files that are critical to the booting process. This option may be desirable when the user only wants to ensure that she has a working copy of the operating system. The maximal backup set, which is selected by clicking the radio button labeled "All," includes all files on the host computer system.

This option may be desirable when the user has sufficient space on the secondary storage device to include all files on the host computer system in the backup set.

Another feature of the X-file viewer shown in FIGS. 5E and 5F is a capacity monitor window for displaying information from capacity monitor 312 (see FIG. 5A). As shown therein, the capacity monitor window includes a pie chart representation of the selected space and free space available on the secondary storage device, e.g., Genesis hard drive. The selected space, free space, and total capacity of the secondary storage device also are displayed in text form in the capacity monitor window. In calculating the amount of space occupied by the selected items, i.e., the selected space, the amount of wasted space should be taken into consideration. Thus, the selected space may be determined by the following equation:

File Size+Wasted Space of the Selected File=Selected Space of Selected File.

Furthermore, for each selected or partially selected folder, i.e., directory, in the X-file viewer, one full cluster size, e.g., 32 KB, should be added. For example, if the "C:\ABC" directory is selected and it has one subfolder "DEF," then the "C:\" directory is partially selected and a total of 3 directories need to be created on the Genesis hard drive. Thus, in addition to the total selected file size, another 96 KB (3×32 KB assuming the cluster size is 32 KB) should be added to obtain the total space of the selected files. Still further, the swap file space should considered when checking the selected space value of the entire booting drive, "C:\." The swap file space varies and, consequently, the selected space value may vary slightly from the value obtained using the equation set forth above. In the event the space occupied by the selected items, i.e., the total selected space of the selected files, reaches the capacity of the secondary storage device, then the X-file viewer may display a warning message to the user.

Yet another feature of the selection window shown in FIGS. 5E and 5F is the "Next" button. When a user clicks on the "Next" button, the selected portions of the internal database are written to a database file, e.g., "Genesis.dat," as mentioned above. In one embodiment, the X-file viewer goes through the system files, programs, desktop shortcuts, and data files and generates the database file in the following manner. The X-file viewer retrieves a list of operating system (OS) files and a list of boot files from FootPrint module 322 (see FIG. 5A) and writes this information to the "Genesis.dat" file. For each of the selected programs and desktop shortcuts, the X-file viewer passes the link (.lnk) file or directory and its selection state to the application finder module. The application finder module then parses through a list for the program and returns the full path name of the selected program. Based upon this information, the X-file viewer applies the applicable state to the appropriate check boxes associated with each item in the internal database. For data files, the X-file viewer writes all selected directories and files to the "Genesis.dat" file. If all subdirectories and files are selected, then the X-file viewer writes only the full path of the selected directory. Upon reading this string, the Backup and Restore Engine 326 (see FIG. 5A) will backup all files within that directory. A sample "Genesis.dat" file, which is structured after the INI format, is shown below in Table 5. The entries in this file are full path file names or directories.

TABLE 5

[OS]
C:\=
C:\Win95=All
C:\Program Files\Common Files=All
[Driver Paths C:\]
C:\Program Files\Matrox MGA PowerDesk\COLOR=All
C:\Program Files\LANDesk\VP5=All
[Driver Paths D:\]
D:\MSVC\BIN=All
[C]
selected directory/file
. . .
[D]
selected directory/file
. . .

After the backup process is complete, each successive time the user runs the Genesis intelligent backup system application, the check boxes of the previously selected files will be set to the selected state. In other words, the next and each subsequent time the X-file viewer module is loaded, the X-file viewer will read through the "Genesis.dat" file to determine which applications, directories, and files have been selected and will place a check mark in the appropriate check boxes displayed in the selection window.

Figure 5G:
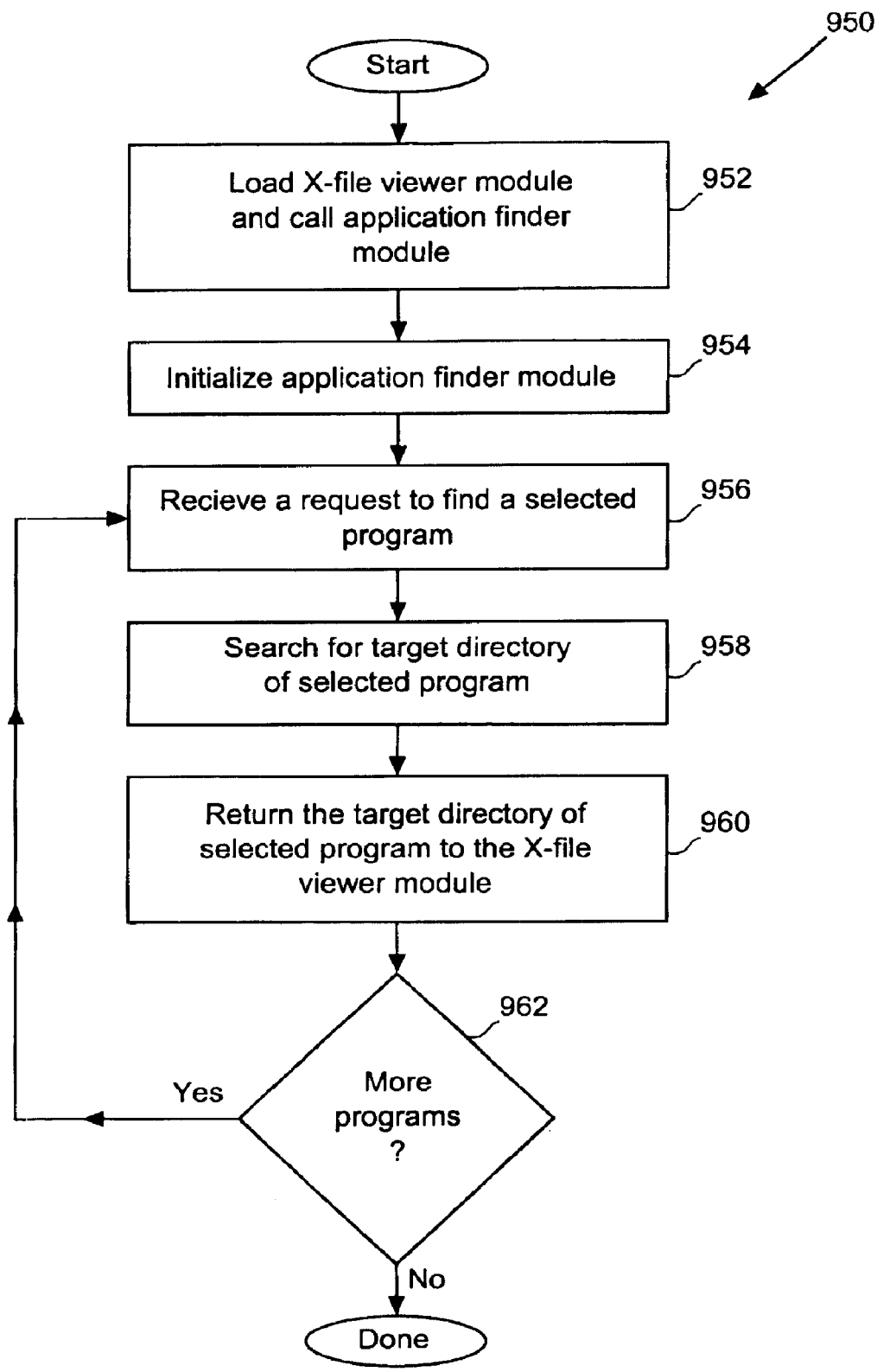
FIG. 5G shows a detailed flowchart diagram illustrating the method operations performed in finding application components for use in the Genesis intelligent backup system in accordance with one embodiment of the present invention.

The application finder 316 (see FIG. 5A) and its functionality will now be described in more detail with reference to FIGS. 5G and 5H. FIG. 5G shows a detailed flowchart diagram 950 illustrating the method operations performed in finding application components in the Genesis intelligent backup system in accordance with one embodiment of the present invention. The method begins in operation 952 in which the X-file viewer module, upon being loaded, calls the application finder module. In operation 954, the application finder module is initialized. During the initialization process, the application finder creates a linked list of all application components installed on the computer system, as described below with reference to FIG. 5H. As used in connection with the description of the invention, the term "application components" includes main application parts and sub-application parts. An exemplary main application part is a program such as Microsoft Word or Excel. An exemplary sub-application part is a dynamic linked list (DLL) file or other piece of code that enables the main application part to provide additional functionality. Next, in operation 956, the application finder receives a request from the X-file viewer to find a selected application. As described above, the X-file viewer issues such a request to the application finder when a user selects an application for inclusion in the backup set by clicking on the appropriate check box. The selected application may be either an individual application, e.g., Microsoft Word, or an application suite, e.g., Microsoft Office.

The method then proceeds to operation 958 in which the linked list of application components is searched to find the target directory of the selected application. Once the target directory of the selected application is located, the application finder returns this target directory to the X-file viewer in operation 960. Alternatively, the application finder may make this target directory available to be accessed by the X-file viewer.

Thereafter, the method proceeds to decision operation 962 in which it is determined whether another application has been selected. If another application has been selected, then the method returns to operation 956 to receive a request to find the selected application. On the other hand, if another application has not been selected, then the method is done.

Figure 5H:
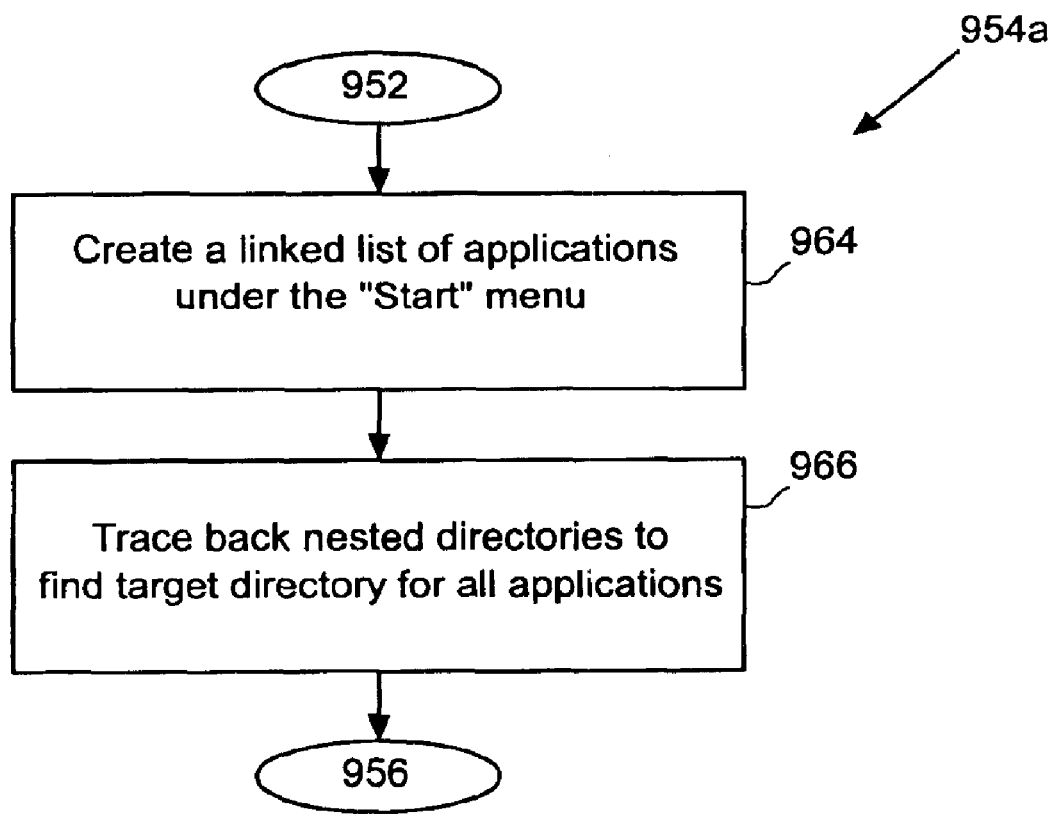
FIG. 5H shows a detailed flowchart diagram illustrating the method operations performed during the initialization of the application finder module in accordance with one embodiment of the present invention.

FIG. 5H shows a detailed flowchart diagram 954a illustrating the method operations performed during the initialization of the application finder module in accordance with one embodiment of the present invention. After operation 952 (see FIG. 5G), the application finder proceeds to create a linked list of the applications installed under the "Start" menu in operation 964. In Windows-type operating systems, the standard is to install applications under the "Start" menu. Those skilled in the art will recognize that applications may be installed elsewhere in other operating systems. The linked list may be created by scanning the computer system using known techniques. The scanning operation preferably includes scanning shortcut link files to find a target directory for each component of applications having a shortcut link file. This feature enables a user to select an application for inclusion in the backup set by selecting the shortcut link to the application. Thus, the application finder obviates the need for the user to know where an application is originally installed on the computer system to select the application for inclusion in the backup set. In operation 966, the application finder traces back nested directories to find the target directory for the selected application components. Thereafter, the method proceeds to operation 956 shown in FIG. 5G.

At the conclusion of operation 966 in FIG. 5H, all target paths for the application components installed on the computer system are known. Operation 964 locates the target directory for main application parts such as Microsoft Word and Excel. Operation 966 locates the target directories for sub-application parts such as, for example, DLL files, which may reside somewhere other than the installed directory because they are shared with other main application parts. By way of example, certain DLL files required for proper operation of Microsoft Word or Excel may reside in the Microsoft Office directory. Thus, the application finder ensures that all components needed for an application to run properly are included in the backup set. By way of example, consider a user who has Microsoft Office installed on her computer system. In this scenario the user will have the following directories installed on the hard drive of her computer system:

C:\Program Files\Microsoft Office\;
C:\Program Files\Microsoft Office\Word;
C:\Program Files\Microsoft Office\Excel; and
C:\Program Files\Microsoft Office\PowerPoint.

If the user selects Excel for inclusion in the backup set, backing up the path "C:\Program Files\Microsoft Office\Excel" will not copy all of the files needed for the proper operation of the Excel program because some of the needed files reside in the directory "C:\Program Files\Microsoft Office\." Thus, it is necessary to trace back through the path "C:\Program Files\Microsoft Office\Excel" until either the root directory, C:\, or the "Program Files" directory is reached. Once one of these directories is reached, the application finder module returns one directory (in this case "Microsoft Office) and appends that directory to the base directory (in this case "C:\Program Files"). Consequently, the resulting directory the application finder module returns as the necessary path is "C:\Program Files\Microsoft Office\."

Figure 6A:
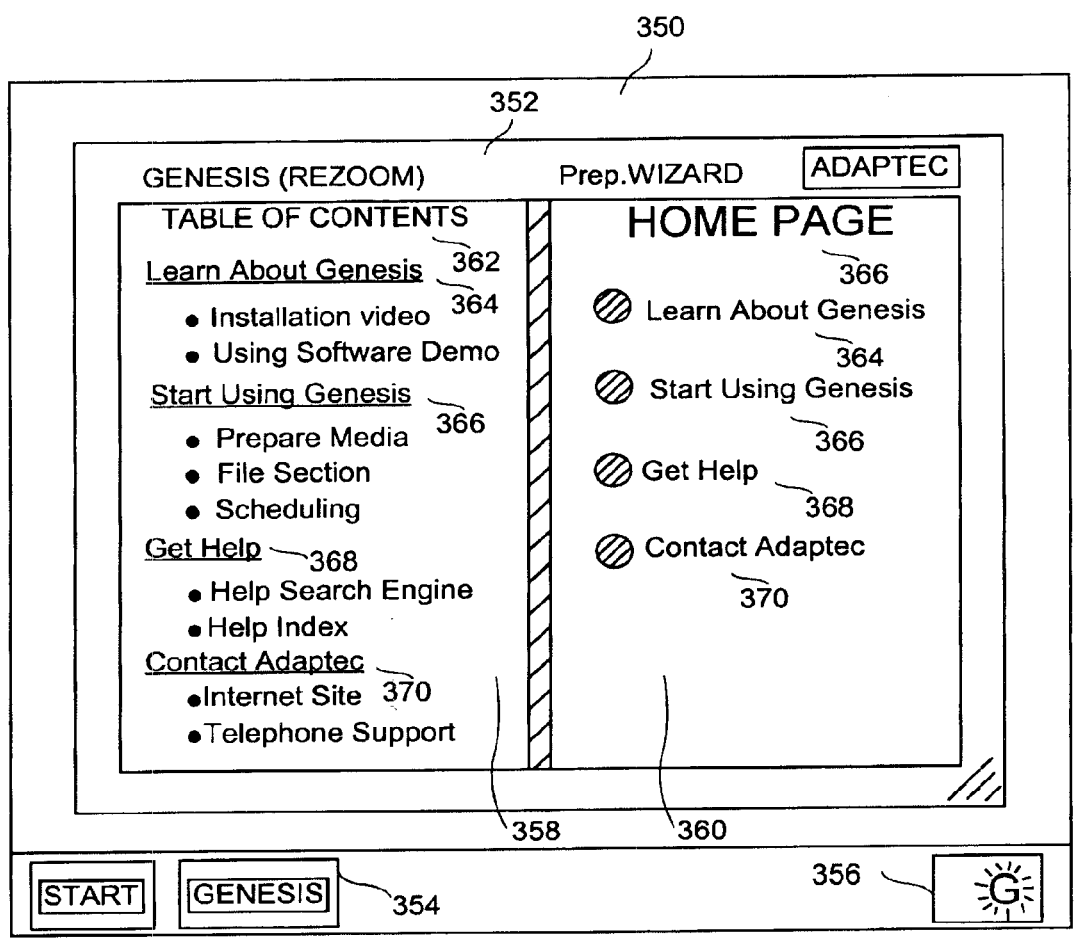
FIG. 6A shows a computer screen illustrating a Genesis Preparation wizard graphical user interface in accordance with one embodiment of the present invention.

FIG. 6A shows a computer screen 350 illustrating a Genesis Preparation Wizard graphical user interface 352 in accordance with one embodiment of the present invention. Upon the installation of the Genesis software, the Preparation Wizard graphical user interface 352 will be presented to the user in a Web page look and feel environment. This Web page look and feel environment will enable the user to learn about the features in Genesis quickly and to start using the Genesis product. The Preparation Wizard graphical user interface 352 is shown having a first frame 358 that includes a table of contents 362, and a second frame 360 that includes a home page 366.

In the table of contents 362, several links are provided including, by way of example, a Learn About Genesis link 364, a Start Using Genesis link 366, a Get Help link 368, and a Contact Adaptec link 370. For exemplary purposes only, the Learn About Genesis link 364 may include an installation video and a software demo. The Start Using Genesis link 366 may include sub-menus for preparing the media, selecting files, and scheduling. The Get Help link 368 may include a help search engine, and a help index to assist the user during the preparation process. In addition, the Contact Adaptec link 370 may include a link to Adaptec's Internet site, and a telephone support directory.

Once the Preparation Wizard graphical user interface 352 is used to install the Genesis software and prepare the peripheral storage device media to be a Genesis-enabled media, the intelligent Genesis backup protection system will run in the background. In this manner, the user operating the intelligent Genesis backup protection system will notice only a small icon 356 that may be displayed in a task bar of a Windows (i.e., 95, 98, etc.) or Windows NT (i.e., 3.51, 4.0, 5.0, etc.) platform. Also, when the preparation wizard graphical user interface 352 is activated, the task bar may also include a link 354 to the Genesis program when in a minimized state. Of course, in other operating systems such as, for example, an Apple Computer OS and a UNIX OS, the program may also operate in the background to avoid interrupting a user during normal use.

Upon being enabled, the intelligent Genesis backup protection system will remain in that active state until a failure to the user's hard drive occurs. At that point, the system BIOS will inform the user that an error has occurred with the computer system's hard drive, and the Adaptec BIOS will provide the user with an option to boot the computer system from the peripheral storage device media.

Figure 6B:
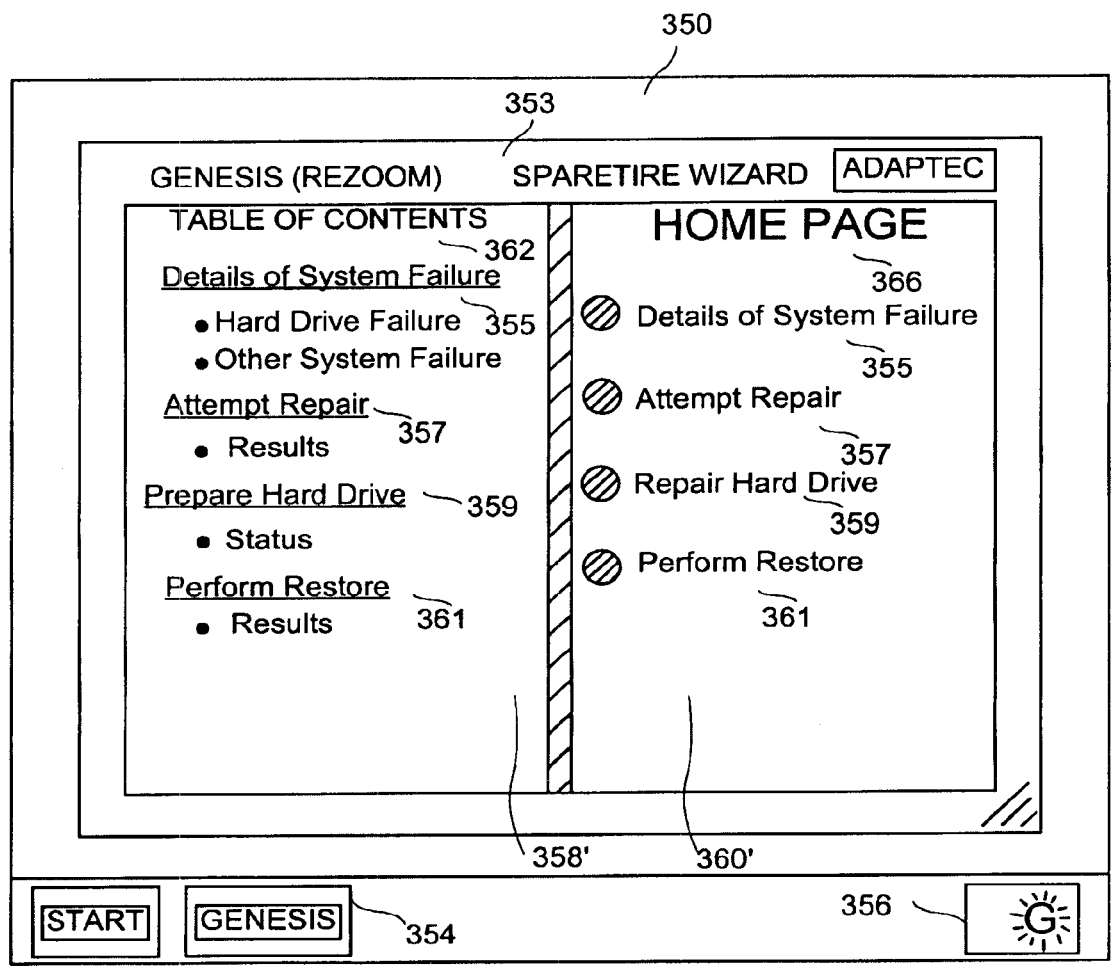
FIG. 6B shows a computer screen illustrating a Genesis SpareTire wizard graphical user interface in accordance with one embodiment of the present invention.

Next, a SpareTire Wizard graphical user interface 353 will be provided to the user as shown in FIG. 6B. Upon launching the SpareTire Wizard 353, a simple-to-use Web page look and feel user interface is provided to the user for ease of use. In this example, the SpareTire Wizard graphical user interface 353 is divided into a first frame 358' and a second frame 360'. In the first frame 358', a Table of Contents 362 is provided. From here, the user may select a Details of System Failure link 355, an Attempt Repair Link 357, a Repair Hard Drive link 359, or a Perform Restore link 361. Upon selecting any one of the aforementioned links, the user will be provided with more information on performing the desired task. On the other hand, the user may desire to continue working from the peripheral storage device media until the computer support personnel assists in repairing the system failure.

FIGS. 7 through 16 provide a more detailed description of the method operations associated with installing the intelligent Genesis backup protection system, preparing the media of the peripheral storage device to be a Genesis-enabled media, scheduling the intelligent backup increments, creating a SpareTire, launching the SpareTire, booting to the peripheral storage drive after failure to continue working, and performing a restore operation.

Figure 7:
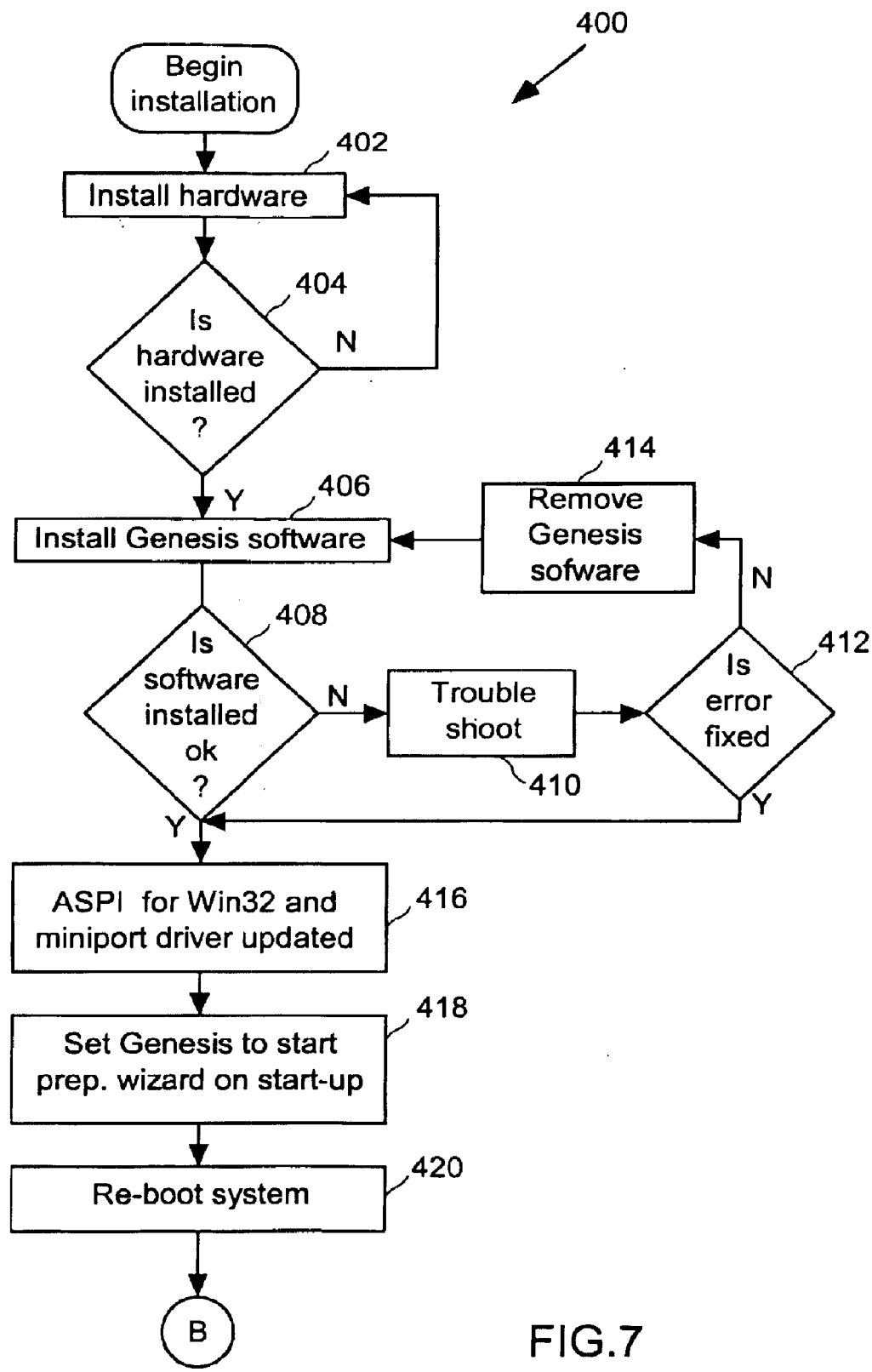
FIGS. 7 and 8 illustrate a more detailed description of the method operations performed during the installation of the Genesis hardware and software in accordance with one embodiment of the present invention.

Reference is now made to FIG. 7 where the installation process 400 of the intelligent Genesis backup protection system is described in accordance with one embodiment of the present invention. The method begins at an operation 402 where the hardware is installed. The hardware includes a SCSI host adapter, a peripheral storage device, and a SCSI cable (or bus) that interconnects the peripheral storage device to the SCSI host adapter. In a preferred embodiment, the SCSI host adapter is preferably an Adaptec host adapter that has a special BIOS which enables booting to a SCSI peripheral storage device even when an EIDE drive is installed in the host computer.

Once the hardware is installed in operation 402, the method proceeds to a decision operation 404. In decision operation 404, it is determined whether the hardware is installed. If the hardware has not been installed, then the method proceeds back to operation 402. On the other hand, if the hardware is installed, then the method proceeds to an operation 406 where the Genesis software is installed. Upon installation, the method proceeds to a decision operation 408 where it is determined whether the software is installed properly. If the software is not installed properly, then the method proceeds to an operation 410 where troubleshooting is performed. Once troubleshooting is performed, the method proceeds to a decision operation 412 where it is determined whether the error is fixed.

If the error is not fixed, then the method will proceed to an operation 414 where the Genesis software is removed from the host computer system. Once the Genesis software is removed from the host computer system, the method proceeds back to the installation operation 406 where the Genesis software is re-installed. On the other hand, if it is determined that the error is fixed in operation 412, then the method will proceed to an operation 416. Likewise, if it is determined in operation 408 that the software is installed properly, then the method will also proceed to operation 416. In operation 416, an ASPI for Win32 and an ASPI for a Miniport driver is updated. Once the update is performed, the method proceeds to an operation 418 where Genesis will start the Preparation Wizard upon startup.

Figure 8:
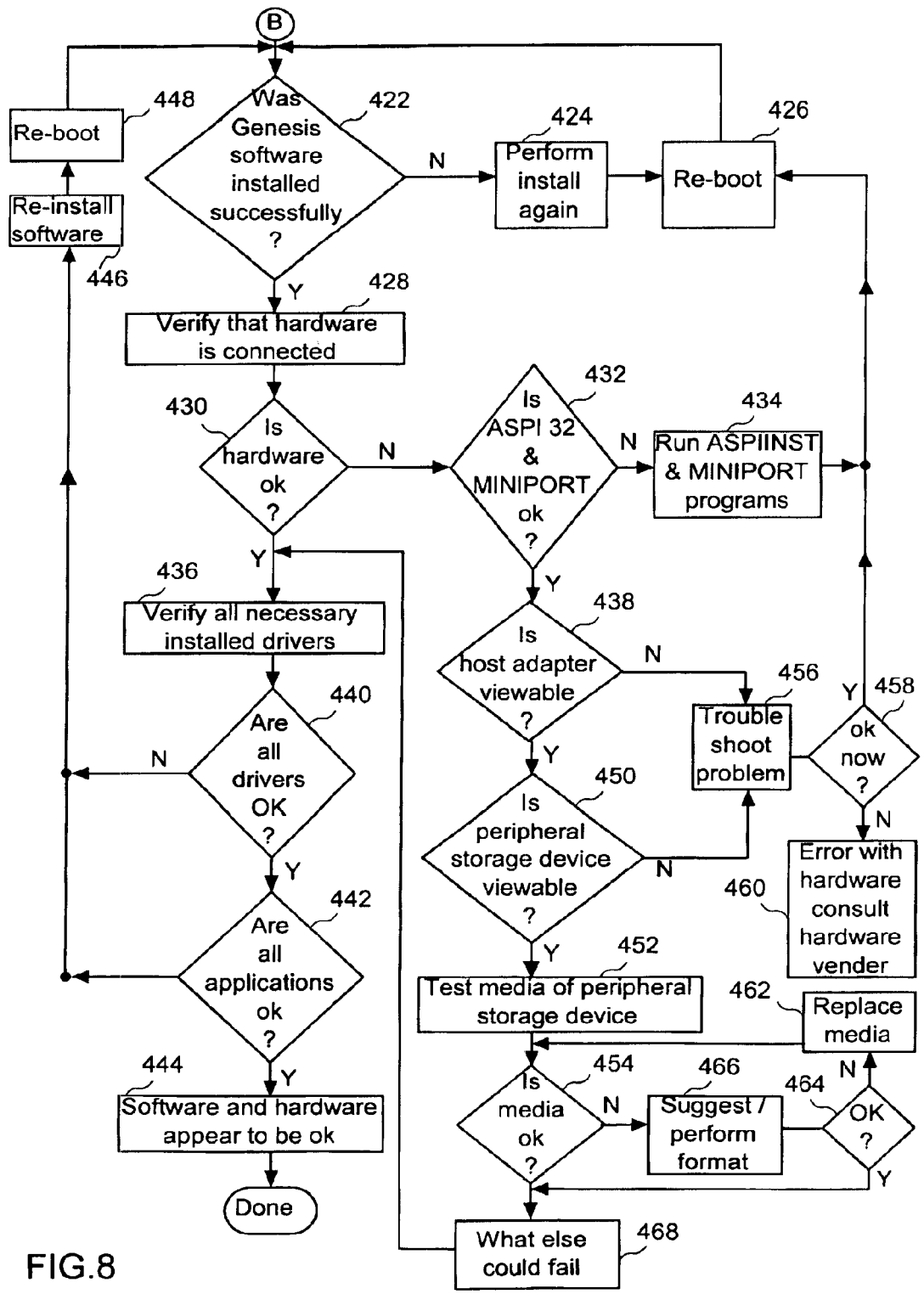

At this point, the method proceeds to an operation 420 where the system is re-booted and then proceeds to a pointer B. With reference to FIG. 8, the method now proceeds to a decision operation 422 where it is determined if the Genesis software is installed properly. If it is not installed properly, then the method will proceed to an operation 424 where the installation is performed again, and then a re-boot is performed in operation 426 before the method reverts back to operation 422. When it is determined that the Genesis software is installed successfully, the method will proceed to an operation 428. In operation 428, a verification is performed to determine whether the hardware is connected. Next, the method will proceed to a decision operation 430 where it is determined whether the hardware is O.K. If the hardware is not O.K., then the method will proceed to a decision operation 432 where it is determined whether the ASPI for Win32 and the ASPI for the Miniport driver are O.K.

If the ASPI for either Win32 or the Miniport driver is not O.K., then the method will proceed to an operation 434. In operation 434, at least one of an ASPI INST program and a Miniport program is run. Upon running the at least one of the ASPI INST and Miniport programs, the operation reverts back to operation 426 where the computer is re-booted. However, if it is determined in operation 432 that the ASPI for Win32 and the ASPI for the Miniport driver are O.K., then the method will proceed to an operation 438. In operation 438, it is determined whether the host adapter is viewable by the host computer system. If the host adapter is not viewable, then the method proceeds to an operation 456 where the problem is troubleshooted.

Next, the method proceeds to a decision operation 458 to determine whether the host adapter is now viewable. If the host adapter is viewable, then the method will proceed back to operation 426 where the computer is re-booted. On the other hand, if it is determined that the host adapter is viewable in operation 438, then the method will proceed to an operation 450 where it is determined whether the peripheral storage device is viewable. If the peripheral storage device is not viewable, then the method will proceed back to operation 456 where the problem is troubleshooted. The method will then proceed back to decision operation 458 to determine whether the problem is now O.K. If the problem is O.K., then the method will return back to operation 426 where the computer is re-booted. However, if it is determined at any point at operation 458 that the problem is not O.K., then the method will proceed to an operation 460 where it is determined that an error has occurred with the hardware and the user is suggested to consult a specific hardware vendor.

Returning again to decision operation 450, if it is determined that the peripheral storage device is viewable, then the method will proceed to an operation 452. In operation 452, the media of the peripheral storage device is tested. The method then proceeds to a decision operation 454 where it is determined whether the media is O.K. If the media is not O.K., then the method will proceed to an operation 466 where it is suggested that a reformat of the media be performed. At this point, the method will proceed to a decision operation 464 where it is determined whether the media is now O.K. If the media is not O.K., then the method will proceed to an operation 462 where the media is replaced.

However, if it is determined that the media is O.K. in operation 454, or if the media is O.K. after a reformat, then the method will proceed to an operation 468 where it is determined whether anything else could fail. Referring now back to decision operation 430, if it is determined that the hardware is O.K., then the method will proceed to an operation 436 where a verification of all necessary install drivers is performed. Once the verification is performed in operation 436, the method proceeds to a decision operation 440. In operation 440, it is determined whether all drivers are O.K. If any driver is not O.K., then the method will proceed to an operation 446 where a re-install of the Genesis software is performed. Once the software is re-installed, the method will proceed to an operation 448 where the computer is re-booted and the method proceeds back to decision operation 422.

On the other hand, if it is determined in operation 440 that all drivers are O.K., then the method will proceed to a decision operation 442 where it is determined whether all applications are O.K. If all applications are not O.K., then the method will again proceed back up to operations 446, 448, and 422 and back down to operation 442. Once all applications are O.K., the method will proceed to an operation 444 where the software and hardware are determined to be O.K., and the installation process will be done.

Figure 9:
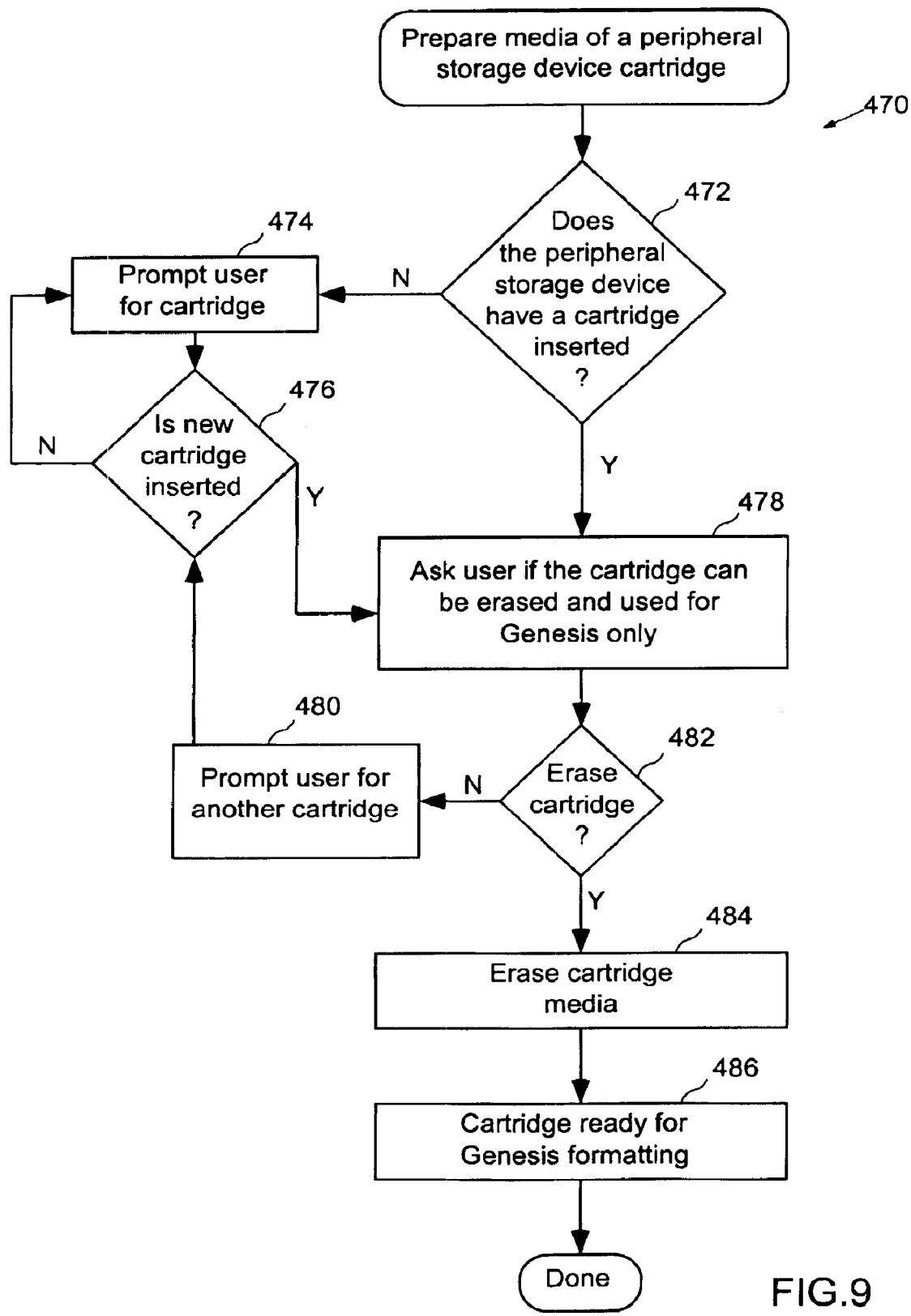
FIG. 9 shows a detailed flowchart diagram illustrating the method operations performed in preparing a media of a peripheral storage device cartridge in accordance with one embodiment of the present invention.

FIG. 9 shows a detailed flowchart diagram 470 illustrating the method operations performed in preparing a media of a peripheral storage device cartridge in accordance with one embodiment of the present invention. In this embodiment, the cartridge is preferably one that has the capability of storing a large amount of data and being inserted into a peripheral storage device, such as a Jaz™ drive. The method now begins at an operation 472 where it is determined whether the peripheral storage device has a cartridge inserted therein.

If the cartridge is not inserted, then the Preparation Wizard graphical user interface 352 will inform the user in operation 474 that the cartridge is not inserted and one should be placed into the peripheral storage device. The method then proceeds to a decision operation 476 where it is determined whether the cartridge that was inserted into the peripheral storage device is new. If the cartridge is not new, then the user will be prompted to insert a new cartridge in operation 474. Once a new cartridge is inserted, the method will proceed to a decision operation 478 where the user is asked whether the cartridge media may be erased and used for Genesis purposes only. The method now proceeds to a decision operation 482 where it is determined whether the cartridge may be erased.

If the cartridge may not be erased, then the method will proceed to an operation 480 where the user is prompted to insert another cartridge that may be erased. If the cartridge may be erased, then the method will proceed from decision operation 482 to an operation 484. In operation 484, the cartridge media is erased. Once the cartridge media has been erased, the method will proceed to an operation 486 where the cartridge media will be ready for Genesis formatting and the method will be done. Of course, if the peripheral storage device is a second hard disk drive, then there will be no need to detect whether a cartridge is inserted, and the hard disk drive media will already be in condition for Genesis formatting.

Figure 10A:
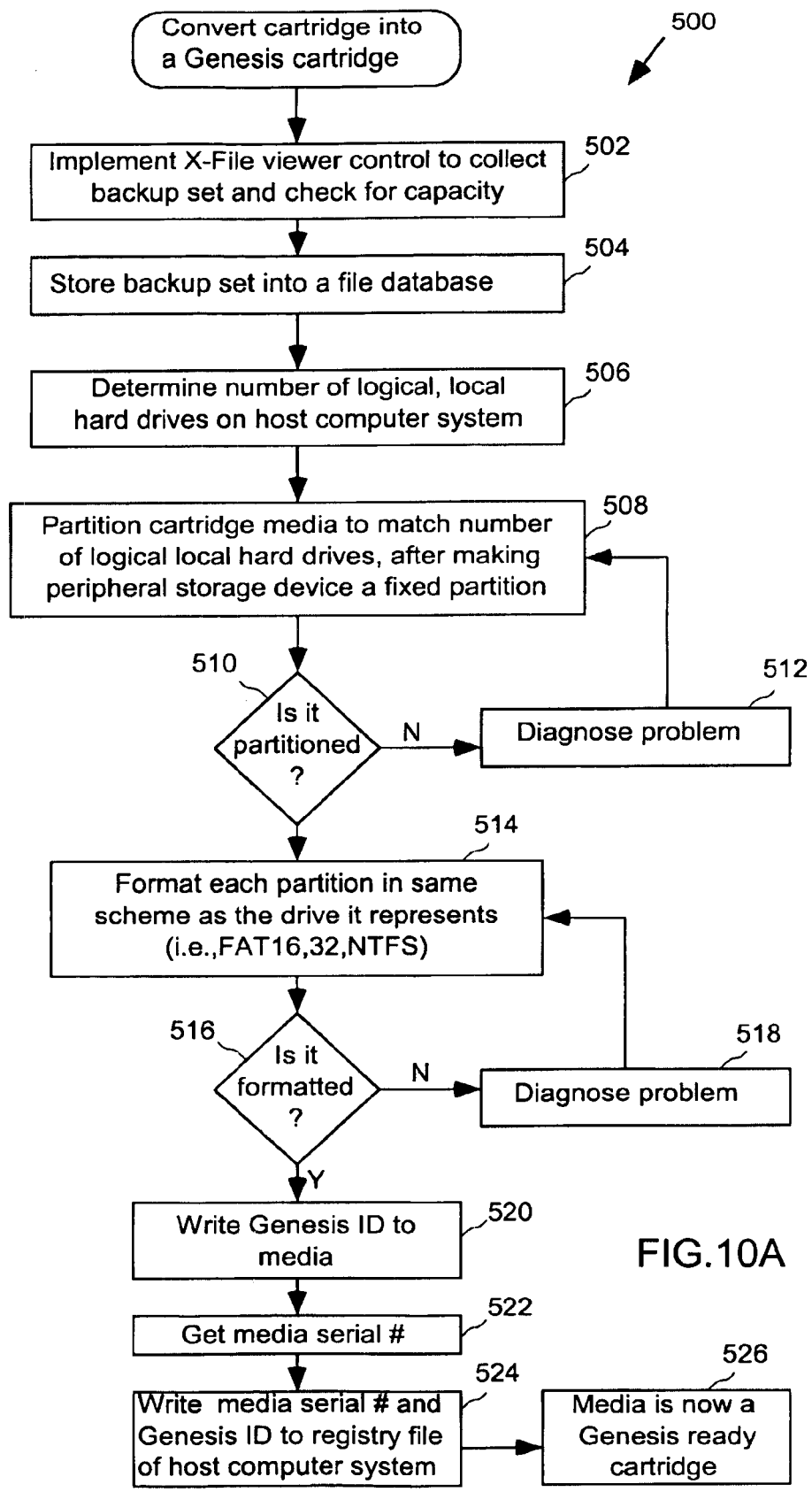
FIG. 10A illustrates the method operations performed in converting a cartridge into a Genesis enabled cartridge in accordance with one embodiment of the present invention.

FIG. 10A illustrates the method operations 500 performed in converting a cartridge into a Genesis-enabled cartridge in accordance with one embodiment of the present invention. In general, when a cartridge has been converted into a Genesis-enabled cartridge, the host adapter BIOS will automatically detect that a Genesis-enabled cartridge has been inserted into the peripheral storage device, and the intelligent Genesis backup protection system will thereby be enabled.

The method begins at an operation 502 where the Preparation Wizard graphical user interface will allow the user to use the X-file viewer control to collect a backup set and check for capacity. As described above with reference to FIG. 5B, the X-file viewer control will allow the user to select certain programs, files, and folders that will be automatically and incrementally backed up by the intelligent Genesis backup system. Of course, certain files such as, for example, boot files and operating system files, will be automatically selected by default to enable booting to the peripheral storage device in the event a system error occurs within the host computer system.

In one embodiment, when the media of the Genesis cartridge holds about two gigabytes (GB) of data, the capacity monitor 312 of FIG. 5B will preferably allow the user to collect data that will fill only about 80 percent of the drive (i.e., about 1.6 GB). In this manner, once the intelligent Genesis backup system is functioning, additional space will be available for saving data during routine use, adding new programs, etc. Once the X-file viewer control has been implemented to collect the backup set and check for capacity in operation 502, the method will proceed to an operation 504. In operation 504, the backup set will be stored into a file database. The file database is essentially a list of all of the programs, files, and data selected by the user to be part of the backup set, and will also provide a pointer to the location in the user's host computer system hard drive.

Once the file database has been generated in operation 504, the method will proceed to an operation 506 in which the number of logical local drive partitions present on the host computer system is determined. Once the number of logical local drives currently present on the host computer system has been determined in operation 506, the method will proceed to an operation 508 where the cartridge media is partitioned to match the number of logical local drives on the host computer system, after making the peripheral storage device a fixed partition. Next, the method proceeds to a decision operation 510 where it is determined whether the cartridge media is partitioned. If the cartridge media is not partitioned correctly, then the method will proceed to an operation 512 where the problem is diagnosed and partitioning is performed again.

If the cartridge media is partitioned correctly, then the method will proceed to an operation 514 where each partition is formatted in the same scheme as the drive it represents. For example, the formatting may be performed in FAT-16, FAT-32, and NTFS schemes. Once each partition has been formatted in operation 514, the method proceeds to a decision operation 516 where it is determined whether each partition is formatted. If each partition is not formatted correctly, then the method will proceed to an operation 518 where the problem is diagnosed and formatting is performed again in operation 514. Once it is determined in operation 516 that the drive is properly formatted, the method will proceed to an operation 520 where a Genesis ID signature is written to the media. After the Genesis ID has been written to the media in operation 520, the media serial number is retrieved by Preparation Wizard 302 of the Genesis software in operation 522.

At this point, the media serial number that was retrieved and the Genesis ID are written to the registry file of the host computer system in operation 524. In this manner, when a cartridge having the Genesis signature ID and the media serial number is inserted into the peripheral storage device, the computer system will know that the intelligent Genesis backup protection system is ready for use. Next, the method will proceed to an operation 526 where the media is now a Genesis-ready cartridge. Of course, any number of cartridges may be formatted in the same way as described with reference to method 500.

FIGS. 10B through 10E illustrate the partitioning performed on the peripheral storage device media when one or more logical local drives are present on the host computer system in accordance with one embodiment of the present invention. For example, FIG. 10B shows an exemplary host computer system A having logical partitions A:, B:, C:, and D:. In this example, partition A: is for a floppy drive, partition B: is for a hard drive, partition C: is for a CD-ROM drive, and partition D: is for a peripheral storage device which may be used for the intelligent Genesis backup protection system. Thus, when only one logical local drive is present on the host computer system A, the peripheral storage device media has one partition and matches that of the host computer system A as shown in FIG. 10C.

FIG. 10D illustrates an example of when a host computer system B has more than one logical local drive partition. In this case, the peripheral storage device media, which is given a fixed logical drive letter F: in the host computer system B, is partitioned into three separate partitions as shown in FIG. 10E. In this example, logical partitions B: and C: are associated with a physical hard disk 527 and logical partition D: is associated with a physical hard disk 528. The resulting partitions in the peripheral storage device are shown in FIG. 10E as partitions 527a, 527b, and 528. In addition, each partition within the peripheral storage device media is sized such that a percentage of the partition is unused to enable the user to use the peripheral storage device media normally after the host computer system has experienced a failure.

FIG. 11A shows a top view of a peripheral storage device media (cartridge media or hard disk media) 530 in accordance with one embodiment of the present invention. In this example, a first track 532 is shown having a master boot record (MBR) in a first sector 534, and a Genesis ID 536 in a second sector following the MBR sector 534. For redundancy purposes, at least a second Genesis ID is written in another sector 538 along the same first track 532. FIG. 11B shows an exemplary Genesis ID signature 536, 538, which will preferably include the designation of Adaptec followed by 43 bytes of a global unique identifier (GUID).

After the Genesis IDs 536, 538 have been written onto the peripheral storage device media 530 in the first track 532, Preparation Wizard 302 of the intelligent Genesis backup protection system will obtain a unique serial number for the peripheral storage device media 530, which is typically located in the media's Z-sector. As shown in FIG. 11C, the media serial number 540 that was retrieved from the Z-sector of the peripheral storage device media 530 will be combined with the Genesis ID to define a single registry file input. In this manner, each time a new peripheral storage device media is prepared to be a Genesis-enabled media, its unique media serial number and the Genesis ID will be placed into the host computer's system registry file and peripheral storage device media. Thus, any time the peripheral storage device media that has been formatted to be a Genesis-enabled media is inserted into a peripheral storage device, the intelligent Genesis backup protection system will be ready to be enabled.

Figure 12:
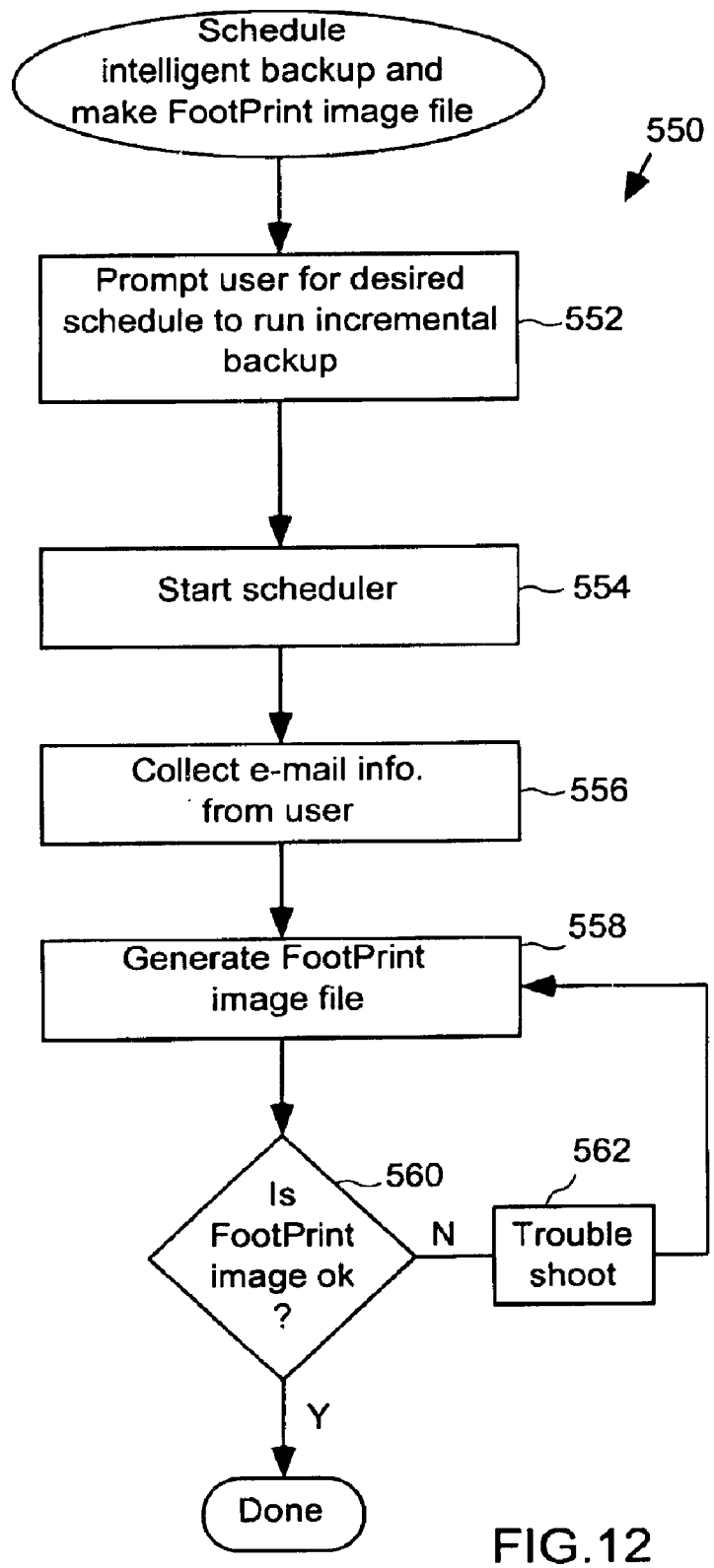
FIG. 12 shows a flowchart diagram illustrating the method operations performed in scheduling the intelligent backup and making a footprint snapshot in accordance with one embodiment of the present invention.

FIG. 12 shows a flowchart diagram 550 illustrating the method operations for scheduling the intelligent backup and making a footprint snapshot, i.e., a FootPrint image file, in accordance with one embodiment of the present invention. The method begins at an operation 552 where the user is prompted to input a desired schedule to run the incremental backup operations. Once the user has input the desired schedule, the method will proceed to an operation 554 where the scheduler is started. Once the scheduler has been started, the method proceeds to an operation 556 where an e-mail address for computer support personnel is collected from the user. As mentioned above, this e-mail address is used by the intelligent Genesis backup system to notify the appropriate computer support personnel that the user has experienced a system failure.

Next, the method proceeds to an operation 558 in which a FootPrint image file of the host computer system's data is generated as described above. Once the FootPrint image file of the computer system's data has been generated, the method will proceed to a decision operation 560 where it is determined whether the FootPrint image file is O.K. If the FootPrint image file is not O.K., then the method will proceed to an operation 562 in which troubleshooting is performed and then the FootPrint image file is generated again in operation 558. Once it is determined that the FootPrint image file is O.K., the method for scheduling the intelligent backup and making a footprint snapshot is done.

Figure 13:
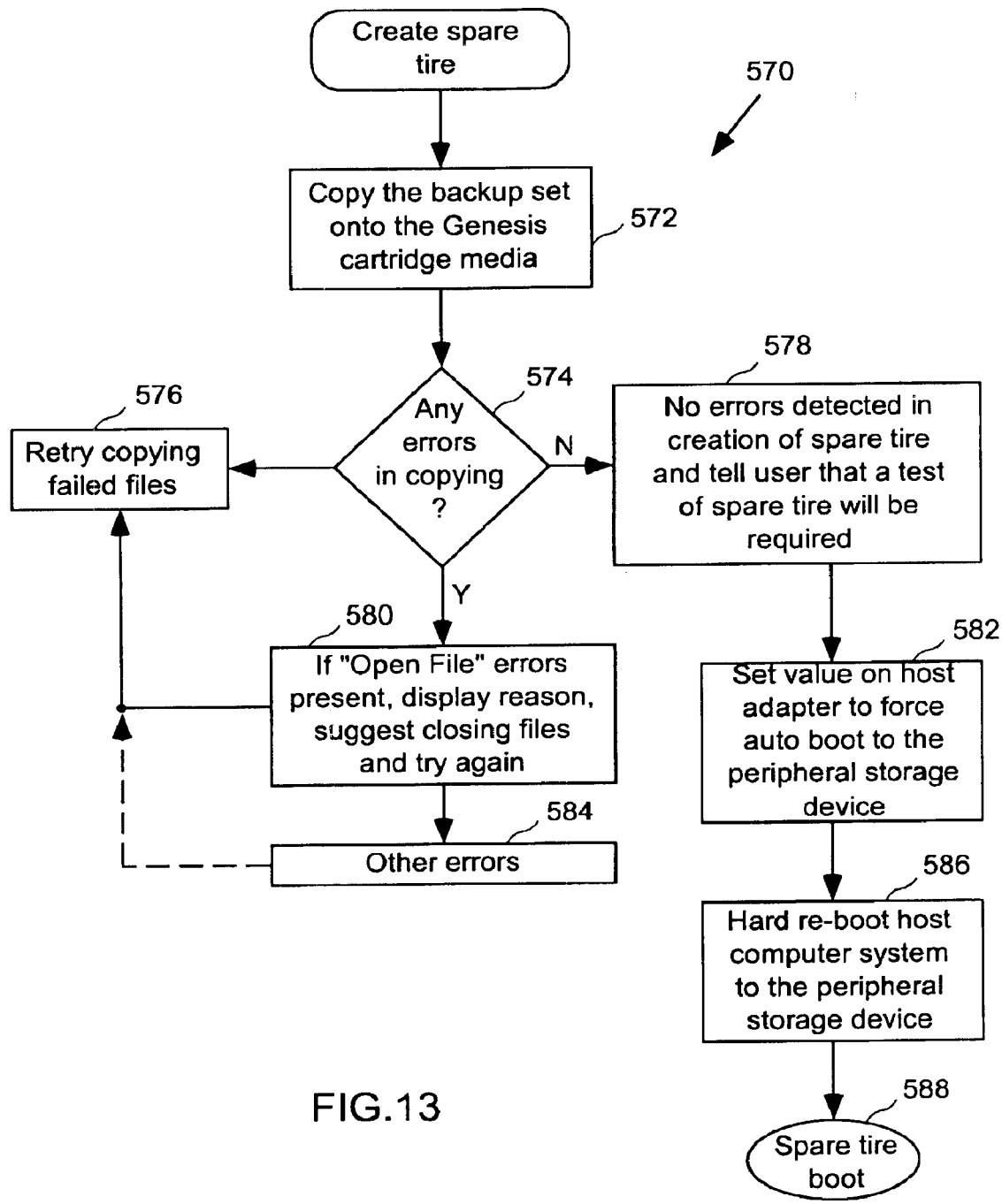
FIG. 13 shows a flowchart diagram detailing the method operations performed in creating a SpareTire in accordance with one embodiment of the present invention.

FIG. 13 shows a flowchart diagram 570 detailing the method operations performed in creating a SpareTire in accordance with one embodiment of the present invention. The method begins at an operation 572 where the backup set selected by the user (including the default backup set) is copied from the host computer system's logical hard drives onto the Genesis cartridge media that has been previously partitioned to match the logical local drives of the host computer system. Once the backup set has been copied onto the Genesis cartridge media in operation 572, the method will proceed to an operation 574.

In operation 574, it is determined whether there were any errors in performing the copying operation. If copying errors are detected, then the method will proceed to an operation 580. In operation 580, if errors occurred due to "open files," then the reason for such errors will be displayed and the user will be prompted to close the files and retry the copying operation. At that point, the method will proceed to an operation 576 where a copying operation will again be performed to copy the failed files. If the copying problem was not the result of open files, then the method will proceed to an operation 584 in which other errors are detected and displayed to the user.

After the user has corrected such problems, the method will again proceed to operation 576 where the copying is again re-tried for those failed files. Once there are no errors in the copying operation, the method will proceed to an operation 578 where the user is informed that a test of the SpareTire will be required. Next, the method will proceed to an operation 582 where a value is set on the host adapter to force an automatic boot to the peripheral storage device. As mentioned above, the host adapter is preferably an Adaptec host adapter or one capable of processing a special Adaptec BIOS, which allows the peripheral storage device to be the boot device, even when an EIDE device is connected to the computer system. Next, the method will proceed to an operation 586 where a hard re-boot of the host computer system is performed to the peripheral storage device. At that point, the SpareTire will be booted at operation 588, and the creation of the SpareTire will be complete.

Figure 14:
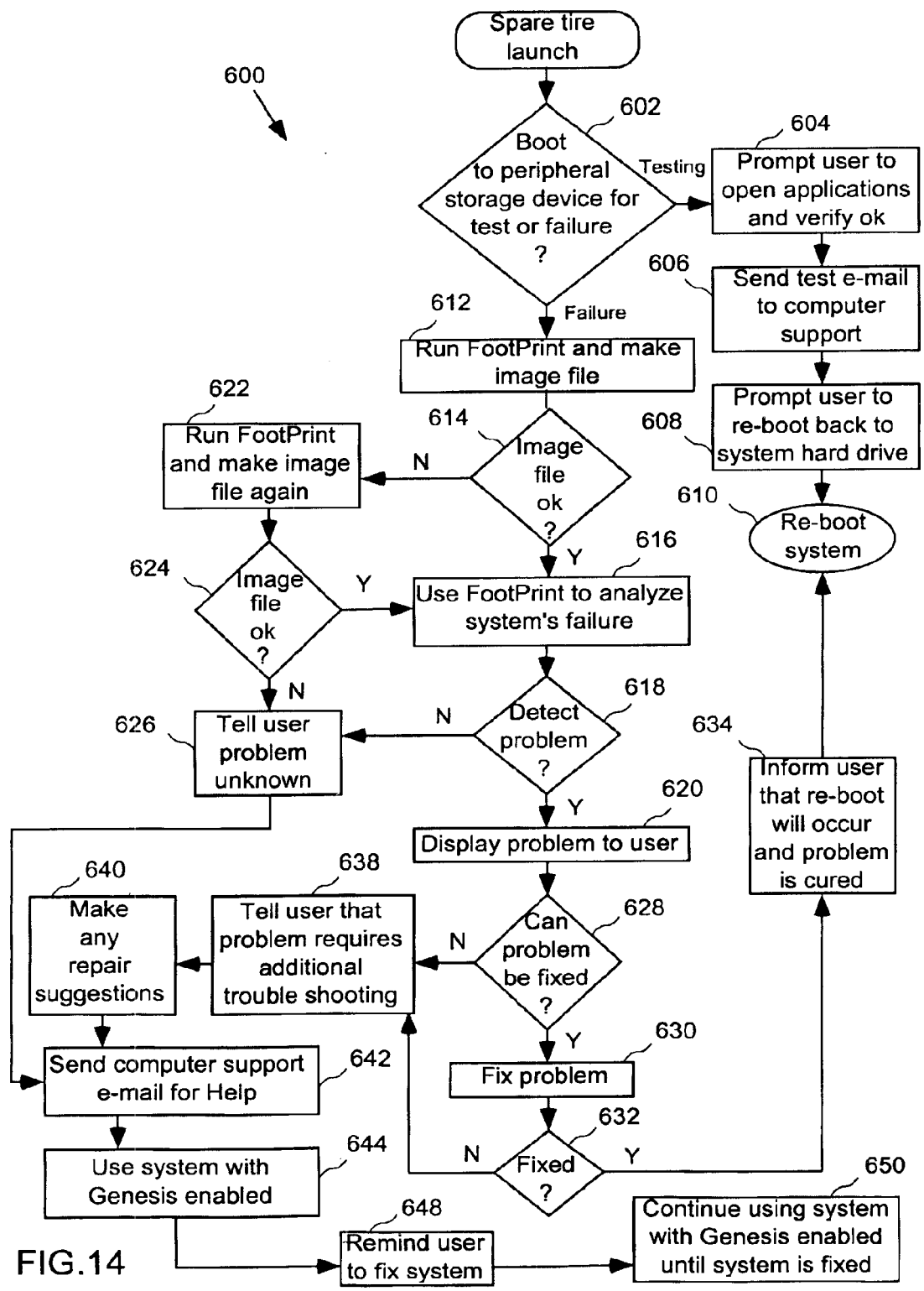
FIG. 14 shows a detailed flowchart diagram illustrating the method operations performed in launching the SpareTire software in accordance with one embodiment of the present invention.

FIG. 14 shows a detailed flowchart diagram 600 illustrating the method operations performed in launching the SpareTire software in accordance with one embodiment of the present invention. The method begins at an operation 602 where it is determined whether booting to the peripheral storage device is performed for test purposes or in the case of a system failure. If booting to the peripheral storage device is performed for testing purposes, then the method will proceed to an operation 604 where the user is prompted to open applications and verify that they have been successfully copied to the peripheral storage device media in the order that they should have appeared if the user were working from the host computer system's hard drive.

The method will then proceed to an operation 606 in which a test e-mail message is sent to the appropriate computer support personnel. Once the e-mail test has been performed, the method will proceed to an operation 608 where the user is prompted to re-boot back to the system hard drive and then the testing aspect of the method will end at operation 610 where the system is re-booted.

On the other hand, in operation 602, the booting to the peripheral storage device may occur because a failure has occurred within the host computer system. In one embodiment, if the user desires to boot from the peripheral storage device, then the user will be instructed by the Adaptec BIOS to press "<CTRL><J>." At that point, the method will proceed to an operation 612 where a FootPrint image file will be generated to provide an image of the host computer system files after the failure has occurred (i.e., the after image).

The method will then proceed to an operation 614 where it is determined whether the FootPrint image file is O.K. If the FootPrint image file is not O.K., then the method will proceed to an operation 622 where the FootPrint engine will be run to generate another image file after the system failure has occurred. At this point, the method will proceed to a decision operation 624 where it is again determined whether the FootPrint image file is O.K. If the FootPrint image file is not O.K., then the method will proceed to an operation 626 where the user is informed that the problem is unknown. On the other hand, if it is determined that the FootPrint image file is O.K. in either operation 624 or 614, then the method will proceed to an operation 616. In operation 616, the FootPrint image file is used to determine the nature of the system failure. Next, the method will proceed to operation 618 where it is determined whether the problem can be detected. If the problem cannot be detected, then the method will proceed to an operation 626 where the user is informed that the problem is unknown.

From operation 626, the method will proceed to an operation 642 where the computer support personnel is sent an e-mail message indicating that a system failure has occurred and that the problem is unknown. However, if it is determined in operation 618 that the problem can be detected, then the method will proceed to an operation 620 where the problem is displayed to the user. The method then proceeds to a decision operation 628 where it is determined whether the problem can be fixed. If the problem cannot be fixed, then the method will proceed to an operation 638 where the user is informed that the problem requires additional troubleshooting.

However, if the problem can be fixed, then the method will proceed from operation 628 to operation 630 in which the problem is fixed. The method now proceeds to a decision operation 632 where it is determined whether the problem is fixed. If the problem is not fixed, then the method will also proceed to operation 638 where the user is informed that the problem requires additional troubleshooting. However, if it is determined in operation 632 that the problem is fixed, then the method will proceed to an operation 634 where the user is informed that a re-boot will occur and that the problem will be cured. At that point, the method will proceed to operation 610 where the system is re-booted and normal operation can continue from the host computer system's hard drive.

In the event the user is informed that the problem requires additional troubleshooting in operation 638, the method will proceed to an operation 640 where any repair that can be performed is suggested. From here, the method will proceed to operation 642 where the computer support personnel is sent an e-mail message notifying them that a failure has occurred within the host computer system, and information regarding the possible system failures is provided. At that point, the method will proceed to an operation 644 where the system can continue to be used from the Genesis-enabled peripheral storage device. In this manner, the user's productivity will not suffer while the computer system's hard drive is being repaired.

While the user is using the computer system with the Genesis-enabled peripheral storage device, the method will proceed to an operation 648 where the user is reminded to fix the problem. The method now proceeds to an operation 650 where the user may continue using the computer system with the Genesis-enabled peripheral storage device until the computer system is fixed, and the SpareTire launch of method 600 will be complete.

Figure 15:
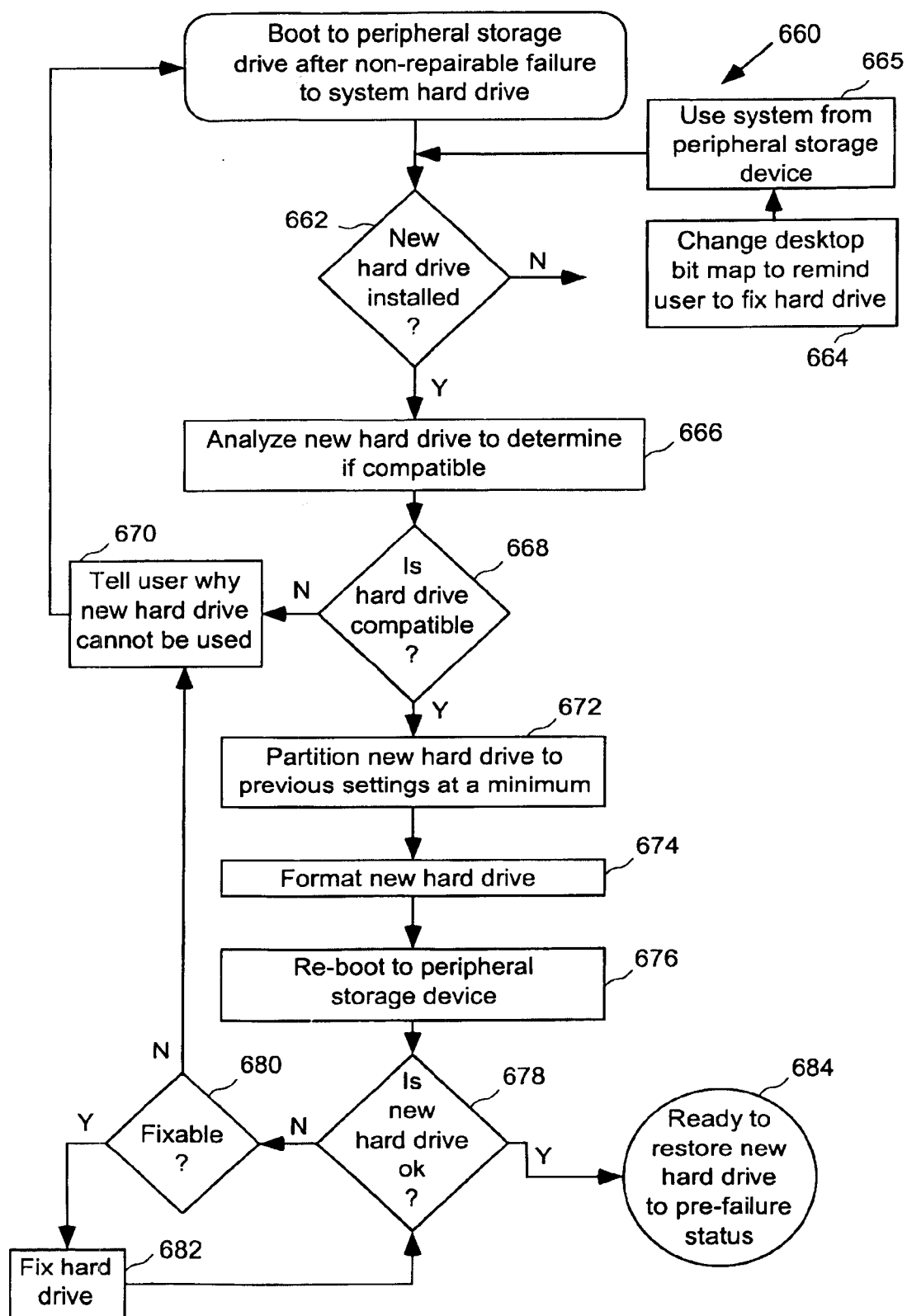
FIG. 15 shows a flowchart diagram illustrating the method operations performed in booting to the peripheral storage device after a non-repairable failure has occurred to the host computer system's hard drive in accordance with one embodiment of the present invention.

FIG. 15 shows a flowchart diagram 660 illustrating the method operations performed in booting to the peripheral storage device after a non-repairable failure has occurred to the host computer system's hard drive. The method begins at a decision operation 662 where it is determined whether a new hard drive has been installed. If a new hard drive has not been installed, then the method will proceed to an operation 664 where the desktop bitmap is changed to remind the user that the system's hard drive should be repaired. This reminder essentially provides the user with a warning that the intelligent Genesis backup protection system is only a temporary fix and, therefore, that appropriate action should be taken to fix the host computer system's hard drive permanently. The method now proceeds to an operation 665 where the system is used from the peripheral storage device, and the method will revert to operation 662.

When a new hard drive has been installed, the method will proceed to an operation 666 in which it is determined whether the new hard drive is compatible with the host computer system. If it is determined in operation 668 that the new hard drive is not compatible, then the user will be informed that a compatible hard drive needs to be installed in operation 670. When a new hard drive that is compatible is installed, the method will proceed to an operation 672 where the new hard drive is partitioned to match the settings that existed in the host computer's hard drive before the system failure. Next, the method will proceed to an operation 674 where the new hard drive is formatted. After formatting, the method proceeds to an operation 676 where a re-boot to the peripheral storage device is performed. At this point, it is determined in operation 678 whether the new hard drive is O.K. If the new hard drive is not O.K., then the method will proceed to an operation 680 where it is determined whether the new hard drive can be fixed.

If the new hard drive can be fixed, then the method will proceed to an operation 682 where the hard drive is fixed. On the other hand, if the new hard drive cannot be fixed, then the method will proceed to an operation 670 where the user is informed that the new hard drive cannot be used and another hard drive needs to be installed. If the new hard drive is determined to be O.K. in operation 678, then the method will proceed to operation 684 where the user is informed that the new hard drive is ready to be restored to its pre-failure status. Of course, if the user added or modified programs or files when working off of the Genesis-enabled media, those changes will also be copied to the new hard drive(s).

Figure 16:
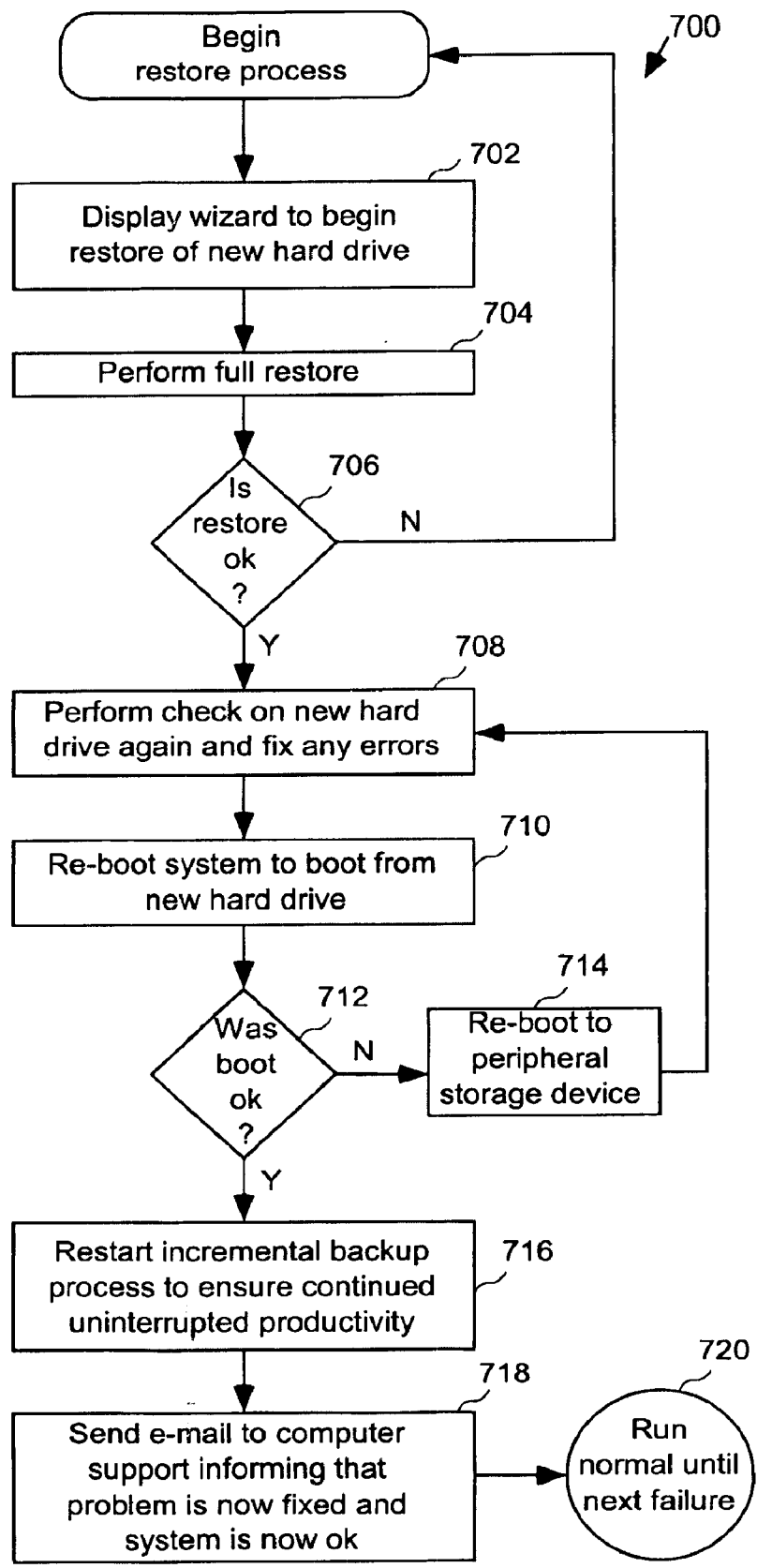
FIG. 16 shows a flowchart diagram illustrating the method operations performed during a restore process in accordance with one embodiment of the present invention.

FIG. 16 shows a flowchart diagram 700 illustrating the method operations performed during a restore process in accordance with one embodiment of the present invention. The restore process begins at an operation 702 where the SpareTire Wizard graphical user interface 353 (see FIG. 6B) is displayed to the user to enable restoration of the new or repaired hard drive(s). Specifically, as shown in frame 360', the user is provided with an option to select the Perform Restore link 361, which launches the full restoration of the new hard drive performed in operation 704. The method now proceeds to a decision operation 706 where it is determined whether the restoration was performed satisfactorily. If the restoration did not restore the hard drive to a satisfactory condition, then the method will proceed back to the beginning of the restoration process.

On the other hand, if the restoration is determined to be O.K. in operation 706, then the method will proceed to an operation 708 where a check is performed on the new hard drive and any errors are fixed. The method now proceeds to an operation 710 where the system is booted from the new hard drive. Now, the method proceeds to a decision operation 712 where it is determined whether the boot to the new hard drive is O.K. If the boot is not performed properly, then the method proceeds to an operation 714 where a re-boot to the peripheral storage device is performed and the method proceeds back to operation 708. If the boot to the restored hard drive is O.K., then the method will proceed from operation 712 to operation 716 where the incremental backup process is restarted to ensure continued uninterrupted productivity in case another failure occurs to the new hard drive(s).

The method then proceeds to an operation 718 in which an e-mail message is sent to the computer support personnel informing them that the problem has now been fixed and that the system is now running O.K. Now, the method proceeds to an operation 720 where the user may run off of the new restored hard drive(s) until another failure occurs and re-booting to the peripheral storage device is again required.

The invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, or otherwise manipulated. Further, the manipulations performed are often referred to using terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 17:
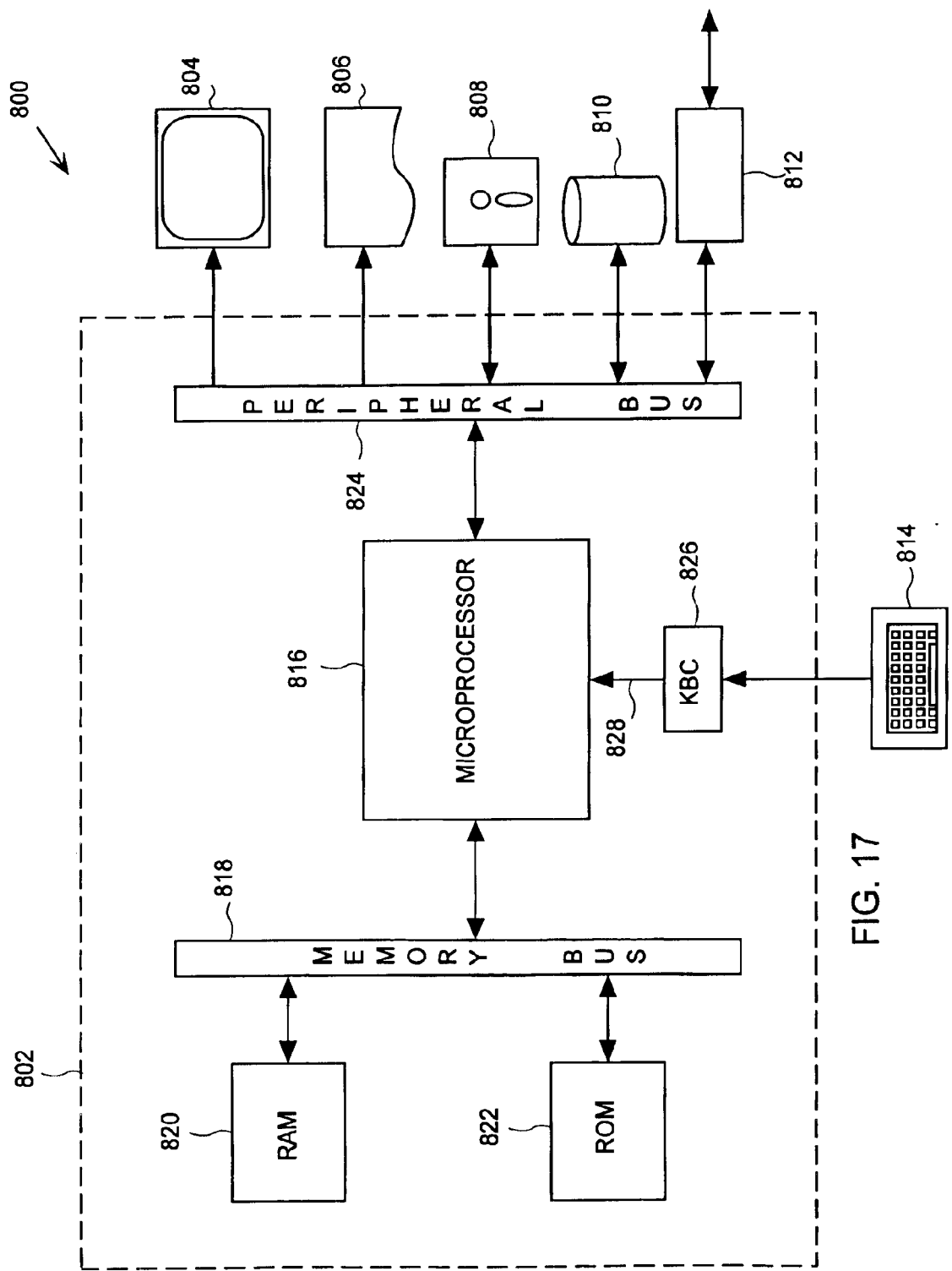
FIG. 17 is a block diagram of an exemplary computer system for carrying out at least part of the processing according to the invention.

FIG. 17 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 800 can be a personal computer (such as an IBM compatible personal computer, a Macintosh computer, or Macintosh compatible computer), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices. According to the invention, a particular function of microprocessor 816 is to assist in execution and rendering of the software operations of the intelligent Genesis backup protection system.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operates to execute computer code and produce and use data. The computer code and data may reside on the RAM 820, the ROM 822, or the hard disk drive 810. The computer code and data could also reside on a removable program medium and be loaded or installed onto the computer system 800 when needed. Removable program mediums include, for example, CD-ROM, PC-CARD, floppy disk, and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general purpose computer.

The invention can also be embodied as computer readable code on a computer readable medium. The computer readable medium is any data storage device that can store data that can be thereafter be read by a computer system. Examples of the computer readable medium include read-only memory, random access memory, CD-ROMs, magnetic tape, and optical data storage devices. The computer readable medium can also be distributed over network-coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. For example, although a preferred type of peripheral storage device is a Jaz™ drive, any type of peripheral storage devices or built-in computer storage devices can be used. In addition, the storage devices can be either physically located next to the computer system itself or remotely networked over, e.g., a local area network (LAN) or the Internet.

In some embodiments, exemplary peripheral-type storage devices may include an extra hard drive(s), a digital video disk (DVD) drive, a CDRW drive, a CDR drive, a Magneto Optical Disk drive, etc. Furthermore, any type of host adapter can be used, regardless of whether it is integrated into a computer's motherboard or is integrated onto a host adapter card. Accordingly, the present embodiments are to be considered as illustrative and not restrictive, and the invention is not to be limited to the details given herein, but may be modified within the scope and equivalents of the appended claims.

What is claimed is:

1. A method for finding application components installed on a computer system for use in a backup system associated with the computer system, comprising:

creating a linked list of application components installed on the computer system;

tracing back nested directories to find a target directory for each application component in the linked list; and receiving a request to find a selected application from a calling module.

2. The method of claim 1, further comprising:

searching the linked list for a target directory for each component of the selected application; and making the target directory for each component of the selected application available to the calling module.

3. The method of claim 2, wherein the target directory for each component of the selected application is returned to the calling module.

4. The method of claim 1, wherein the operation of creating the linked list of application components installed on the computer system includes scanning shortcut link files to find a target directory for each component of applications having a shortcut link file.

5. The method of claim 1, wherein the calling module includes a graphical user interface that displays the applications installed on the computer system.

6. The method of claim 1, wherein the selected application is one of an individual application and an application suite.

7. The method of claim 1, wherein the application components include a main application part and at least one sub-application part.

8. The method of claim 1, wherein the computer system is a personal computer.

9. A method for finding application components installed on a computer system for use in a backup system associated with the computer system, comprising:

creating a linked list of application components installed on the computer system;

tracing back nested directories to find a target directory for each application component in the linked list;

receiving a request to find a selected application from a calling module;

searching the linked list for a target directory for each component of the selected application; and returning the target directory for each component of the selected application to the calling module.

10. The method of claim 9, wherein the operation of creating the linked list of application components installed on the computer system includes scanning shortcut link files to find a target directory for each component of applications having a shortcut link file.

11. The method of claim 9, wherein the calling module includes a graphical user interface that displays the applications installed on the computer system.

12. The method of claim 9, wherein the selected application is one of an individual application and an application suite.

13. The method of claim 9, wherein the application components include a main application part and at least one sub-application part.

14. The method of claim 9, wherein the computer system is a personal computer.

15. A computer readable media containing program instructions for finding application components installed on a computer system for use in a backup system associated with the computer system, the computer readable media comprising:

program instructions for creating a linked list of application components installed on the computer system;

program instructions for tracing back nested directories to find a target directory for each application component in the linked list; and program instructions for receiving a request to find a selected application from a calling module.

16. The computer readable media of claim 15, further comprising:

program instructions for searching the linked list for a target directory for each component of the selected application; and program instructions for making the target directory for each component of the selected application available to the calling module.

17. The computer readable media of claim 15, wherein the program instructions for making the target directory for each component of the selected application available to the calling module include program instructions for returning the target directory for each component of the selected application to the calling module.

18. The computer readable media of claim 15, wherein the program instructions for creating the linked list of application components installed on the computer system include program instructions for scanning shortcut link files to find a target directory for each component of applications having a shortcut link file.

19. The computer readable media of claim 15, wherein the calling module includes a graphical user interface that displays the applications installed on the computer system.

20. The computer readable media of claim 15, wherein the selected application is one of an individual application and an application suite.

21. The computer readable media of claim 15, wherein the application components include a main application part and at least one sub-application part.

* * * * *